(12) United States Patent
Imai et al.

(10) Patent No.: US 7,626,714 B2
(45) Date of Patent: Dec. 1, 2009

(54) INTERNAL INTERFACE IN IMAGE PROCESSING APPARATUS AND CONTROL THEREOF

(75) Inventors: Takashi Imai, Chiba (JP); Seiya Fujinaga, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1978 days.

(21) Appl. No.: 10/322,419

(22) Filed: Dec. 19, 2002

(65) Prior Publication Data
US 2003/0123074 A1 Jul. 3, 2003

(30) Foreign Application Priority Data
Dec. 28, 2001 (JP) ............................. 2001-401352
Jul. 26, 2002 (JP) ............................. 2002-218577

(51) Int. Cl.
*G06K 15/00* (2006.01)

(52) U.S. Cl. ..................... 358/1.15; 358/468; 358/1.13; 709/223; 710/313

(58) Field of Classification Search ................. 358/1.1, 358/1.6, 1.9, 1.15, 468; 709/223, 224, 226; 710/3, 8, 9, 16, 17, 20, 36, 107, 305, 306, 710/308, 313; 370/462
See application file for complete search history.

(56) References Cited

U.S. PATENT DOCUMENTS

| | | | | |
|---|---|---|---|---|
| 4,910,607 A | | 3/1990 | Kita et al. .................... | 358/400 |
| 5,220,674 A | * | 6/1993 | Morgan et al. ............... | 709/223 |
| 5,724,555 A | * | 3/1998 | Wadsworth .................. | 358/468 |
| 5,764,866 A | * | 6/1998 | Maniwa ....................... | 358/1.15 |
| 5,905,582 A | | 5/1999 | Hirai et al. ................... | 358/468 |
| 6,091,507 A | * | 7/2000 | Vatland et al. ............... | 358/1.15 |
| 6,307,974 B1 | | 10/2001 | Tsujimoto ................... | 382/239 |
| 6,348,973 B1 | * | 2/2002 | Vatland et al. .............. | 358/1.15 |
| 6,412,022 B1 | | 6/2002 | Kumpf et al. ................ | 710/1 |
| 6,711,626 B1 | * | 3/2004 | Okada .......................... | 710/36 |
| 6,976,101 B2 | * | 12/2005 | Terasaki et al. ............... | 710/20 |
| 7,000,035 B1 | * | 2/2006 | Uchizono et al. ............. | 710/3 |
| 7,038,818 B2 | | 5/2006 | Namizuka et al. ........... | 358/468 |
| 7,126,983 B1 | * | 10/2006 | Peshkin et al. .............. | 375/222 |
| 7,167,928 B2 | * | 1/2007 | Uchizono et al. ........... | 710/107 |
| 7,295,338 B2 | * | 11/2007 | Satake et al. ................ | 358/1.15 |

(Continued)

FOREIGN PATENT DOCUMENTS

EP 0 702 480 A2 3/1996

(Continued)

OTHER PUBLICATIONS

Nov. 8, 2005 Japanese Official Action in Japanese Patent Appln. No. 2001-401352 (with English-language translation).

(Continued)

*Primary Examiner*—Kimberly A Williams
(74) *Attorney, Agent, or Firm*—Fitzpatrick, Cella, Harper & Scinto

(57) ABSTRACT

Image processing apparatus having a data processing unit, a first interface having a plurality of logical channels for connecting with an external processing apparatus, a second interface having a logical channel that has a different configuration from the first interface for connecting with the data processing unit, and a control unit for controlling data transfer between the first interface and second interface.

6 Claims, 15 Drawing Sheets

U.S. PATENT DOCUMENTS

| | | | |
|---|---|---|---|
| 7,394,577 B2 * | 7/2008 | Namizuka et al. | 358/468 |
| 7,499,191 B2 * | 3/2009 | Han et al. | 358/1.15 |
| 7,561,285 B2 * | 7/2009 | Fujinaga et al. | 358/1.15 |
| 2001/0043344 A1 * | 11/2001 | Imai et al. | 358/1.9 |
| 2001/0050782 A1 * | 12/2001 | Niitsuma et al. | 358/1.15 |
| 2005/0157328 A1 * | 7/2005 | Han et al. | 358/1.15 |
| 2006/0028684 A1 * | 2/2006 | Namizuka et al. | 358/1.16 |
| 2006/0080491 A1 * | 4/2006 | Uchizono et al. | 710/313 |
| 2006/0095602 A1 * | 5/2006 | Watanabe | 710/16 |
| 2007/0053376 A1 * | 3/2007 | Oshima et al. | 370/462 |
| 2007/0088869 A1 * | 4/2007 | Kadota | 710/36 |
| 2007/0263248 A1 * | 11/2007 | Oshima et al. | 358/1.15 |
| 2007/0291301 A1 * | 12/2007 | Ozawa et al. | 358/1.15 |
| 2008/0077725 A1 * | 3/2008 | Yabuki | 710/305 |

FOREIGN PATENT DOCUMENTS

| | | |
|---|---|---|
| EP | 0 818 918 A2 | 1/1998 |
| EP | 0 859 327 A2 | 8/1998 |
| EP | 0 932 291 A1 | 7/1999 |
| EP | 0 987 878 A1 | 3/2000 |
| EP | 1 133 153 A2 | 9/2001 |
| JP | 7-288625 | 10/1995 |
| JP | 2000-215144 A | 8/2000 |
| JP | 2000-231458 | 8/2000 |
| JP | 2001-203833 | 7/2001 |
| JP | 2002-042119 | 2/2002 |

OTHER PUBLICATIONS

Mar. 25, 2005 Japanese Office Action in Japanese Patent Appln. No. 2001-401352 (with partial English translation).

Nov. 8, 2005 Japanese Official Action in Japanese Patent Appln. No. 2001-401352.

* cited by examiner

FIG. 12

| OFFSET | HEXADECIMAL VALUE | DESCRIPTION | |
|---|---|---|---|
| 0 | 12th | TOTAL LENGTH OF DEVICE DESCRIPTOR | ~1401 |
| 1 | 01h | TYPE OF DESCRIPTOR | ~1402 |
| 2 | 00h | UPPER PART OF USB VERSION NUMBER | ~1403 |
| 3 | 02h | LOWER PART OF USB VERSION NUMBER | ~1404 |
| 4 | 00h | CLASS CODE | ~1405 |
| 5 | 00h | SUBCLASS CODE | ~1406 |
| 6 | 00h | PROTOCOL | ~1407 |
| 7 | 40h | MAXIMUM PACKET SIZE OF ENDPOINT 0 | ~1408 |
| 8 | xxh | LOWER PART OF MANUFACTURER ID | ~1409 |
| 9 | xxh | UPPER PART OF MANUFACTURER ID | ~1410 |
| 10 | xxh | LOWER PART OF PRODUCT ID | ~1411 |
| 11 | xxh | UPPER PART OF PRODUCT ID | ~1412 |
| 12 | 00h | LOWER PART OF RELEASE NUMBER | ~1413 |
| 13 | 01h | UPPER PART OF RELEASE NUMBER | ~1414 |
| 14 | 01h | INDEX TO MANUFACTURER NAME | ~1415 |
| 15 | 02h | INDEX TO PRODUCT NAME | ~1416 |
| 16 | 03h | INDEX TO SERIAL NUMBER | ~1417 |
| 17 | 01h | NUMBER OF CONFIGURATIONS | ~1418 |

INTERNAL INTERFACE IN IMAGE PROCESSING APPARATUS AND CONTROL THEREOF

FIELD OF THE INVENTION

The present invention relates to an internal interface in an image processing apparatus, and control thereof.

BACKGROUND OF THE INVENTION

As a known facsimile apparatus connectable with a data processing terminal, such as a personal computer, there is a facsimile apparatus connected with the terminal through a two-way parallel port (compliant with IEEE 1284) interface, e.g., Centronics or the like, or a Universal Serial Bus (USB) interface, as disclosed in Japanese Patent Application Laid-Open No. 7-288625.

In an image processing system constructed with the aforementioned facsimile apparatus and data processing terminal, as a connection form between the facsimile apparatus and data processing terminal, a single logical interface is assigned to a single physical interface.

A brief construction of an image processing apparatus 1100 which constitutes a conventional image processing system is described in detail with reference to FIG. 15.

In the image processing apparatus 1100, a CPU 1101 serving as a system control unit controls the entire image processing apparatus 1100. ROM 1102 stores control programs and an incorporated operating system (OS) program or the like, which are executed by the CPU 1101. Each of the control programs stored in the ROM 1102 executes software controlling, e.g., scheduling, task switch, interruption and so on, under the control of the incorporated OS stored in the ROM 1102, thereby a multi-task function including print control, read control, and communication control is realized.

RAM 1103, configured with SRAM (static RAM) which requires a back-up power source, or the like, keeps stored data by receiving power supply from a primary battery (not shown) for data back-up. The RAM 1103 stores program control variables or the like which must not be lost, and setting values registered by an operator as well as control data of the image processing apparatus 1100 and so on, and includes a buffer area for various works. Image memory 1104, configured with DRAM (dynamic RAM) or the like, stores image data to be handled in the image processing apparatus 1100 and status information obtained from a recording unit 1115. Further, a part of the image memory 1104 is secured as a work area for software processing.

A data conversion unit 1105 performs image data conversion, such as interpretation of a page description language (PDL) or the like, computer graphics (CG) development of character data and so on.

A reading control unit 1106 performs various image processing, e.g., binarization, halftone processing or the like, on an image signal obtained by a reading unit 1107, which optically reads an original document with the use of a contact image sensor (CIS) and converts the read data to electric image data, through an image processing control unit (not shown) and outputs high-definition image data. Note that the reading control unit 1106 and the reading unit 1107 are adaptable to both a sheet-reading control method of performing reading while conveying an original document with the CIS fixed at a predetermined position, and a book-reading control method of scanning an original document placed on a platen while moving the CIS.

An operation display unit 1108, including numeric value input keys, character input keys, one-touch telephone number keys, mode setting keys, an OK key, a cancel key and so on, is constructed with an operation unit for a user to decide image transmission destination data or to perform registration operation of setting data, various keys, a light-emitting diode (LED), and a liquid crystal display (LCD). The operation display unit 1108 displays operator's various input operations and an operation state or status of the image processing apparatus 1100.

A communication control unit 1109 is constructed with a modulator-demodulator (MODEM), a network control unit (NCU) and so on. The communication control unit 1109 is connected with an analogue communication line (PSTN) 1131 to perform, for instance, communication control according to the T30 protocol, or line control such as call out and call in of the communication line.

A resolution conversion processing unit 1110 performs resolution conversion control, such as millimeter-to-inch resolution conversion of image data. Note that in the resolution conversion processing unit 1110, enlargement/reduction processing of image data is possible. A coding/decoding processing unit 1111 performs coding/decoding processing on image data (non-compressed or compressed with MH, MR, MMR, JBIG, JPEG or the like) handled by the image processing apparatus 1100, or performs enlargement/reduction processing.

A print control unit 1112 performs various image processing, such as smoothing, print density correction, color correction and so on, on image data subjected to printing through an image processing control unit (not shown), and thus converts the data to high-definition image data to be outputted to an IEEE 1284 host control unit 1114 (to be described later).

A USB function control unit 1113, which performs communication control of a USB interface, performs protocol control according to the USB communication standard, converts data transmitted from a USB control task executed by the CPU 1101 into a packet, and transmits the USB packet to an external data processing terminal (not shown), or inversely, converts a USB packet from an external data processing terminal into data and transmit the data to the CPU 1101. The USB communication standard realizes high-speed two-way data communication, and allows a plurality of hubs or functions (slaves) to connect with one host (master). The USB function control unit 113 serves as a function in the USB communication.

The IEEE 1284 host control unit 1114 is a control unit for performing communication according to a protocol designated by a compatibility mode of the IEEE 1284 communication standard. The compatibility mode of the IEEE 1284 communication standard, capable of one-way data communication, can connect one host (master) with one peripheral (slave). The IEEE 1284 host control unit 1114 serves as the host in the IEEE 1284 communication, and transmits only print data to the printing unit 1115.

The printing unit 1115, which is a printing device configured with a laser beam printer, inkjet printer or the like, prints color image data or monochrome image data on a printing material. The printing unit 1115 communicates with the IEEE 1284 host control unit 1114 according to a protocol designated by the compatibility mode of the IEEE 1284 communication standard. Particularly the printing unit 1115 serves as the peripheral. In the IEEE 1284 communication, the printing unit 1115 receives print data from the IEEE 1284 host control unit 1114. Meanwhile, the printing unit 1115 performs asynchronous serial interface (UART) communication with a serial I/F control unit 1116 (to be described later). In the asynchronous serial interface communication, the printing unit 1115 receives a command from or transmits print status data to the serial I/F control unit 1116.

The serial I/F control unit 1116 is a control unit for performing asynchronous serial interface communication. Asynchronous serial interface communication is low-speed data communication capable of full-duplex transmission. The serial I/F control unit 1116 transmits a command to or receives print status data from the printing unit 1115.

The aforementioned components 1101 to 1106, 1108 to 1114 and 1116 are connected to each other through a CPU bus 1121 controlled by the CPU 1101.

However, in the above-described conventional image processing system, since only one logical interface is assigned to a single physical interface, there is a great problem in a case where a data processing terminal controls a multi-function facsimile apparatus integrally having a plurality of functions, such as a printer, scanner, facsimile communication and so forth. More specifically, it is impossible to simultaneously operate the plurality of functions, thus unable to sufficiently take advantage of the merit of the multi-function facsimile apparatus.

To force the simultaneous operation of the plurality of functions, the following workload is required. More specifically, in a data processing terminal, it is necessary to add header information specifying a function, such as a printer, scanner, facsimile communication or the like, to the head of an intended control command, edit and packet the data, and transmit the packeted data to the multi-function facsimile apparatus. Therefore, there are great problems in terms of an alteration workload of a driver which is installed in a data processing terminal, complexity of the control, and a throughput.

Moreover, in the multi-function facsimile apparatus which receives packeted data from the data processing terminal, it is necessary to analyze the packeted data to specify whether the data is related to a printer, scanner, or facsimile communication. In addition, it is necessary to delete and edit the header information added to the head of the control command. Therefore, there are great problems in terms of complexity of the control and a throughput.

Furthermore, the main control unit and printing unit included inside the facsimile apparatus are connected through one-way low-speed parallel communication dedicated to print data transfer. Therefore, in order for the main control unit to acquire printing information of the printing unit, it is necessary to provide a physical interface independent of the one-way parallel communication. This also causes the problems of an increased workload in designing products and complexity of the control. Further, if a printing unit capable of high-speed printing is used, transfer speed of print data from the main control unit to the printing unit is too slow to make the best use of the ability of the printing unit.

In addition, in integrating a reading/writing device from/to a detachable storage medium in the image processing apparatus, another different physical interface is necessary.

SUMMARY OF THE INVENTION

The present invention has been made in consideration of the above situation, and has as its object to easily realize simultaneous operation of a plurality of functions, such as a printer, scanner, facsimile communication and so forth, in an image processing apparatus.

According to the present invention, the foregoing object is attained by providing an image processing apparatus comprising: a data processing unit; a first interface unit, having a plurality of logical channels, adapted to connect with an external processing apparatus; a second interface unit, having a logical channel that has a configuration different from the first interface unit, adapted to connect with the data processing unit; and a control unit adapted to control data transfer between the first interface unit and the second interface unit.

According to another aspect of the present invention, the foregoing object is also attained by providing an image processing apparatus comprising: a bus connection unit adapted to connect the control unit with a plurality of data processing units in two-way direction; and a controller connected with the bus connection unit via a bus, wherein the bus connection unit realizes two-way connection between the controller and the plurality of data processing units.

Further, according to the present invention, the foregoing object is also attained by providing a control method of an image processing apparatus including: a data processing unit; a first interface unit, having a plurality of logical channels, which is adapted to connect with an external processing apparatus; and a second interface unit, having a logical channel that has a configuration different from the first interface unit, which is adapted to connect with the data processing unit, the method comprising controlling data transfer between the first interface unit and the second interface unit.

Furthermore, according to another aspect of the present invention, the foregoing object is also attained by providing a control method of an image processing apparatus including a bus connection unit adapted to connect the control unit with a plurality of data processing units in two-way direction and a controller connected with the bus connection unit via a bus, wherein the bus connection unit realizes two-way connection between the controller and the plurality of data processing units, the method wherein acquiring attribute information of the plurality of data processing units through the bus connection unit at the time of power-on initialization of the image processing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is an explanatory view of device descripter numerical strings of a recording unit or the memory card RW unit according to the second embodiment of the present invention;

DETAILED DESCRIPTION OF THE PREFERRED EMBODIMENT

A preferred embodiment of the present invention will be described in detail in accordance with the accompanying drawings.

First Embodiment

Figure 1:
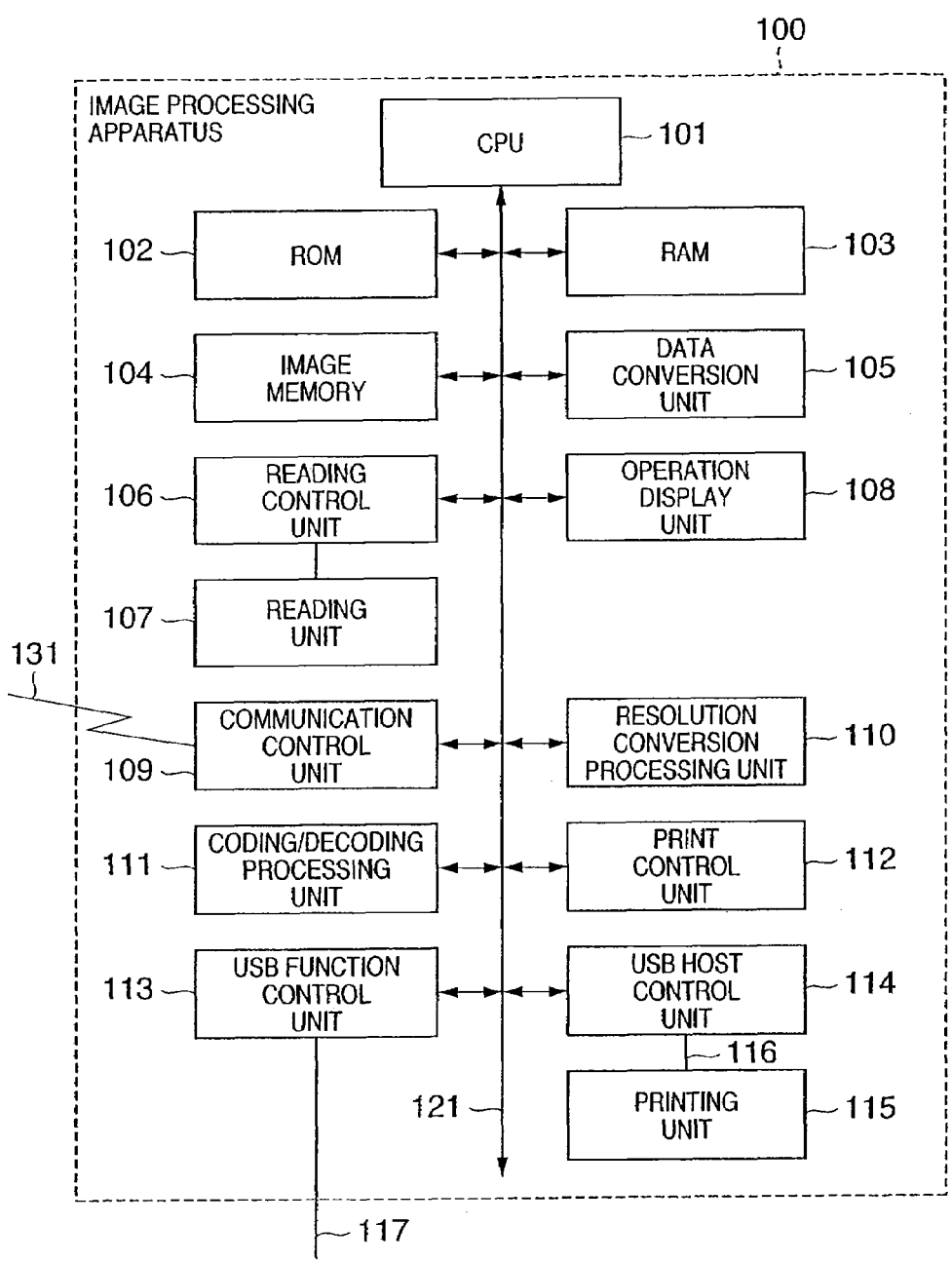
FIG. 1 is a block diagram showing a construction of an image processing apparatus according to a first embodiment of the present invention.

First, a brief construction of an image processing apparatus 100, which constitutes an image processing system according to a first embodiment of the present invention, is described in detail with reference to FIG. 1.

In the image processing apparatus 100, a CPU 101 serving as a system control unit controls the entire image processing apparatus 100. ROM 102 stores control programs and an incorporated operating system (OS) program or the like, which are executed by the CPU 101. In the first embodiment, each of the control programs stored in the ROM 102 realizes software controlling, e.g., scheduling, task switch, interruption and so on, under the control of the incorporated OS stored in the ROM 102.

RAM 103, configured with SRAM (static RAM) or the like, stores program control variables or the like, and setting values registered by an operator as well as control data of the image processing apparatus 100, and so on, and includes a buffer area for various works. Image memory 104, configured with DRAM (dynamic RAM) or the like, stores image data.

A data conversion unit 105 performs image data conversion, such as interpretation of a page description language (PDL) or the like, CG (computer graphics) development of character data and so on.

A reading control unit 106 performs various image processing, e.g., binarization, halftone processing or the like, on an image signal obtained by a reading unit 107, which optically reads an original document with the use of a contact image sensor (CIS) and converts the read data to electric image data, through an image processing control unit (not shown) and outputs high-definition image data. Note in the first embodiment, the reading control unit 106 is adaptable to both a sheet-reading control method of performing reading while conveying an original document with the CIS fixed at a predetermined position, and a book-reading control method of scanning an original document placed on a platen while moving the CIS.

An operation display unit 108, including numeric value input keys, character input keys, one-touch telephone number keys, mode setting keys, an OK key, a cancel key and so on, is constructed with an operation unit for a user to decide image transmission destination data or to perform registration operation of setting data, various keys, a light-emitting diode (LED), a liquid crystal display (LCD), and a display unit for displaying operator's various input operation and an operation state or status of the image processing apparatus 100.

A communication control unit 109 is constructed with a modulator-demodulator (MODEM), a network control unit (NCU) and so on. In the first embodiment, the communication control unit 109 is connected with an analogue communication line (PSTN) 131 to perform, for instance, communication control according to the T30 protocol, or line control such as call out and call in of the communication line. Note that the types of communication line and communication protocol are not limited to those mentioned above, but regardless of wired or wireless, an available communication line and communication protocol may be employed.

A resolution conversion processing unit 110 performs resolution conversion control, such as millimeter-to-inch resolution conversion of image data. Note that in the resolution conversion processing unit 110, enlargement/reduction processing of image data is possible. A coding/decoding processing unit 111 performs coding/decoding processing on image data (MH, MR, MMR, JBIG, JPEG or the like) handled by the image processing apparatus 100, or performs enlargement/reduction processing.

A print control unit 112 performs various image processing, such as smoothing, print density correction, color correction and so on, on image data subjected to printing through an image processing control unit (not shown), and thus converts the data to high-definition image data to be outputted to a USB host control unit 114 (to be described later). Furthermore, by controlling the USB host control unit 114, the print control unit 112 also serves to periodically acquire status information data of the printing unit 115.

A USB function control unit 113, which performs communication control of a USB interface 117, performs protocol control according to the USB communication standard, converts data transmitted from a USB control task executed by the CPU 101 into packets, and transmits the USB packets to an external data processing terminal, or inversely, converts USB packets from an external data processing terminal into data and transmit the data to the CPU 101. The USB communication standard realizes high-speed two-way data communication, and allows a plurality of hubs or functions (slaves) to connect with one host (master). The USB function control unit 113 serves as the function in the USB communication.

The USB host control unit 114 is a control unit for performing communication according to a protocol defined in the USB communication standard. The USB host control unit 114 serves as the host in the USB communication.

The printing unit 115, which is a printing device configured with a laser beam printer, inkjet printer or the like, prints color image data or monochrome image data on a printing material. Further, EEPROM (Electronically Erasable and Programmable Read Only Memory), which does not require back-up power source, is provided inside of the printing unit 115, and stores print control parameters and the like. The printing unit 115 communicates with the USB host control unit 114 according to a protocol defined in the USB communication standard, and is connected with the USB host control unit 114 through a USB interface 116. Particularly, the printing unit 115 serves as the function. In the first embodiment, the USB communication for using a printing function adopts a one-to-one connection form.

The CPU 101 transmits data indicative of what kind of processing the printing unit 115 is to perform to the USB host control unit 114. The USB host control unit 114 is connected with the CPU 101 via CPU bus 121, and connected with the printing unit 115 via a USB interface 116. The USB host control unit 114 converts the data transmitted from the CPU 101 to the printing unit 115 to a form so as to be transmitted according to a protocol defined in the USB communication standard, thereby controlling the printing unit 115. Further, when the printing unit 115 returns data to the CPU 101, the USB host control unit 114 converts the data so as to be transmitted to the CPU 101 via the CPU bus 121. In this manner, the USB host control unit 114 controls the printing unit 115, serving as a function in the USB communication standard, in place of the CPU 101.

The aforementioned components 101 to 106 and 108 to 114 are connected to each other through a CPU bus 121 controlled by the CPU 101.

Figure 2:
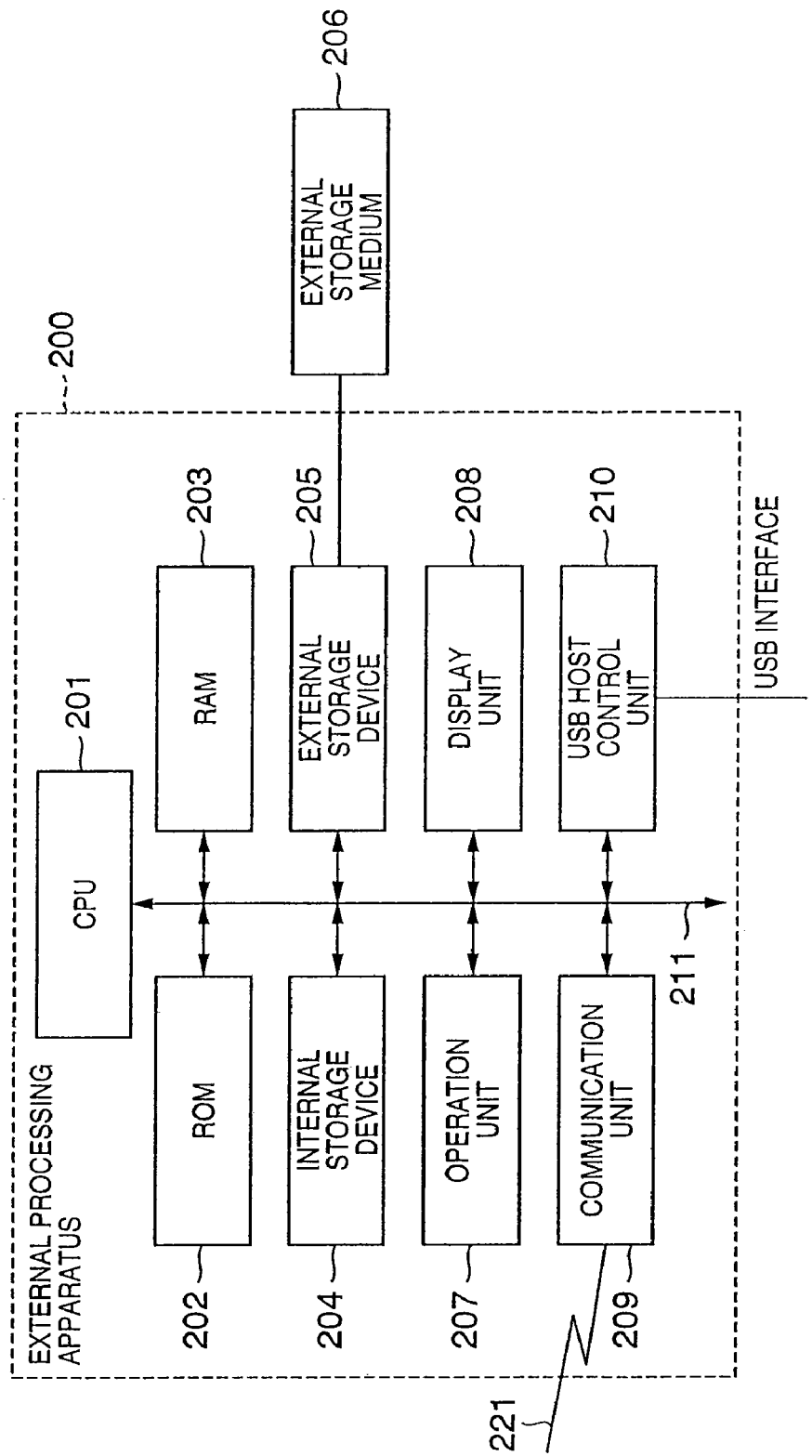
FIG. 2 is a block diagram showing a construction of a processing apparatus according to the first embodiment of the present invention.

Next, a brief construction of a processing apparatus 200, e.g., a data processing terminal, which constitutes the image processing system together with the image processing apparatus 100, is described with reference to FIG. 2.

A CPU 201 controls the entire operation of the processing apparatus 200 through a system bus, according to a program which is read out of ROM 202, RAM 203, or an internal storage device 204, or a program read out of an external storage medium 206 by an external storage device 205.

The ROM 202 stores a control program or the like of the CPU 201. The RAM 203 temporarily stores a program or image data to enable high-speed processing of the processing apparatus 200.

The internal storage device 204 stores an operating system, various application programs, image data and so on. Assume that the internal storage device 204 is installed with application software for transmitting/receiving various commands and data to/from the image processing apparatus 100, which include a character data processing steps according to the first embodiment, printer driver software, scanner driver software, facsimile driver software, USB-class driver software for each function, USB bus driver software and so forth. Normally, these application software and driver software are installed by receiving data from the external storage disk 206 (medium such as a floppy disk or CD-ROM), storing the software under control of the external storage device 205. Alternatively, the application software and driver software can be received by a communication unit 209 (network and modem) through a communication line and installed in the internal storage device 204.

An operation unit 207 controls a keyboard or a mouse (not shown), which serves as operator's designation input unit. To execute printing, normally the keyboard or mouse of the operation unit 207 is used.

A display unit 208 performs various displaying for an operator. In a case where execution of printing is designated in the external processing terminal 200, a confirmation dialogue or the like is displayed on the display unit 208 to prompt an operator to input. Further, during execution of a printing operation, the display unit 208 provide data indicative of print status to the operator.

The communication unit 209 realizes connection with a network (not shown), realizes connection with an Internet provider through a communication line, or performs communication of data, image data or the like with a destination communication apparatus. Note with respect to connection with a network or a communication line, assume that a well-known method is used; thus a description thereof is omitted.

A USB host control unit 210, which performs communication control of a USB interface, converts data from the CPU 201 into packets in accordance with the USB communication standard and transmits the USB packets to the image processing apparatus 100, or inversely, converts USB packets from the image processing apparatus 100 into data and transmits the data to the CPU 201. With respect to a communication control method, assume that a well-known communication control method is used; thus a description thereof is omitted.

Figure 3:
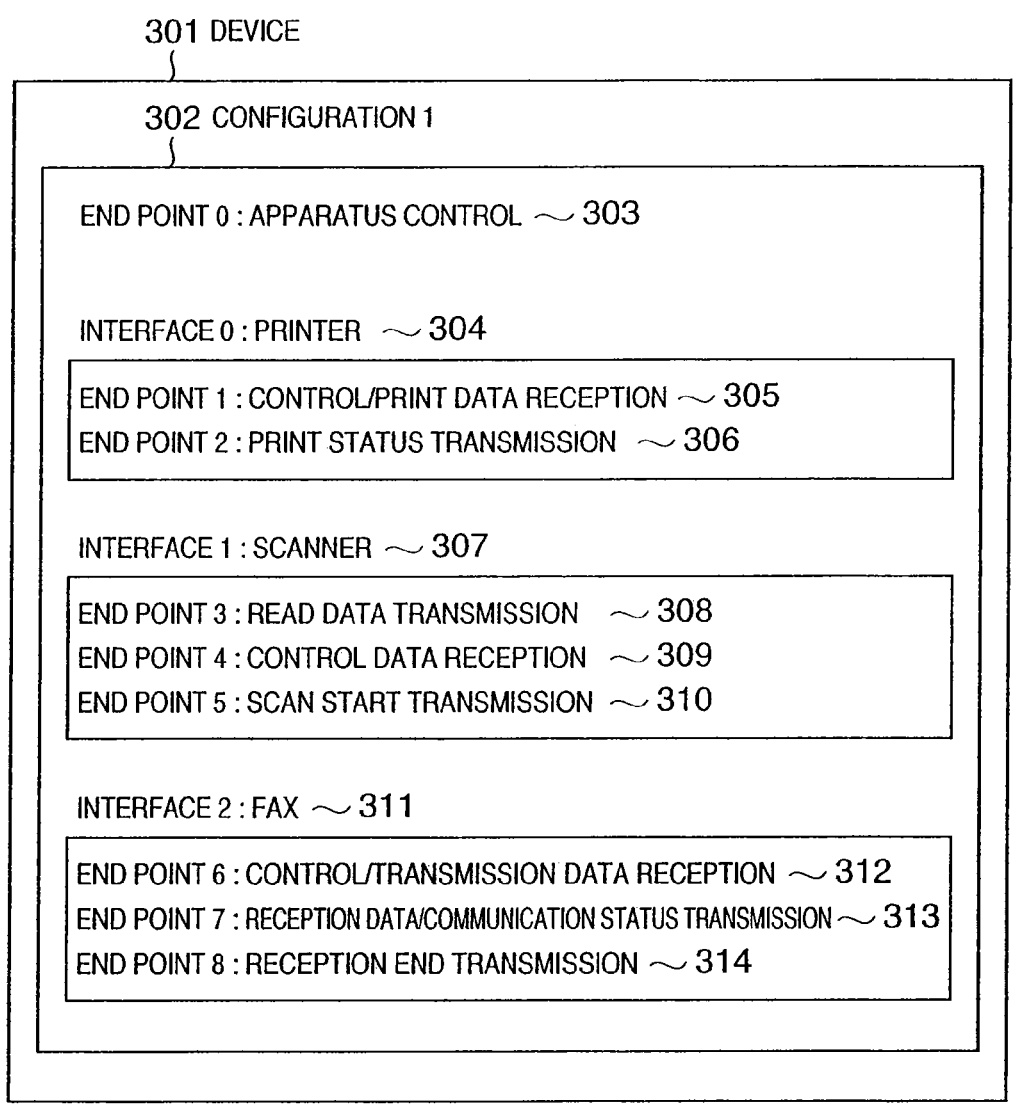
FIG. 3 is a conceptual view showing a USB configuration of the image processing apparatus according to the first embodiment of the present invention.

FIG. 3 is a conceptual view showing a configuration of the image processing apparatus, the expression of the configuration is compliant with the USB communication standard, according to the first embodiment of the present invention. The USB function control unit 113 controls the USB interface according to this configuration.

A device 301 represented by the largest frame can be defined solely in the USB communication standard, and indicates an attribute of the entire apparatus. The apparatus mentioned herein corresponds to the image processing apparatus 100. The attribute of the device 301 is expressed by a device descriptor, which includes an apparatus manufacturer ID, a product ID, a release number, the number of configurations and so forth. In the first embodiment, the number of configurations is "1".

Accordingly, in the device 301, only one configuration (configuration 1 (302)) is defined. An attribute of the configuration 1 (302) is expressed by a configuration descriptor, which includes the number of interfaces in the configuration. In this embodiment, the number of interfaces is "3".

Accordingly, in the configuration 1 (302), three interfaces (interfaces 0 to 2 (304, 307, 311)) are defined. Attributes of the interfaces 0 to 2 (304, 307, 311) are expressed by an interface descriptor, which includes the number of end points in the interface, a class code and so forth. In the first embodiment, the number of end points in the interface 0 (304) used for a printer is "2"; the number of end points in the interface 1 (307) used for a scanner is "3"; and the number of end points in the interface 2 (311) used for FAX transmission/reception is "3".

Accordingly, in the interface 0 (304) used for a printer, two end points (end points 1 and 2 (305, 306)) are defined. Attributes of the end points 1 and 2 (305, 306) are expressed by an end point descriptor, which includes an end point number of the end point, a communication direction, the type of transfer, a packet size and so forth. The end point 1 (305) is used mainly for receiving control data or print data. The end point 2 (306) is used mainly for transmitting a received print status of print data.

Furthermore, in the interface 1 (307) used for a scanner, three end points (end points 3, 4 and 5 (308, 309, 310)) are defined. Attributes of the end points 3, 4 and 5 (308, 309, 310) are expressed by an end point descriptor, which includes an end point number of the end point, a communication direction, the type of transfer, a packet size and so forth. The end point 3 (308) is used mainly for transmitting read data. The end point 4 (309) is used mainly for receiving control data. The end point 5 (310) is used mainly for informing a start of scanning.

Furthermore, in the interface 2 (311) used for FAX transmission/reception, three end points (end points 6, 7 and 8 (312, 313, 314)) are defined. Attributes of the end points 6, 7 and 8 (312, 313, 314) are expressed by an end point descriptor, which includes an end point number of the end point, a communication direction, the type of transfer, a packet size and so forth. The end point 6 (312) is used mainly for receiving control data and FAX transmission data. The end point 7 (313) is used mainly for transmitting FAX reception data and a communication state of FAX transmission/reception. The end point 8 (314) is used mainly for informing an end of FAX reception.

Figure 4:
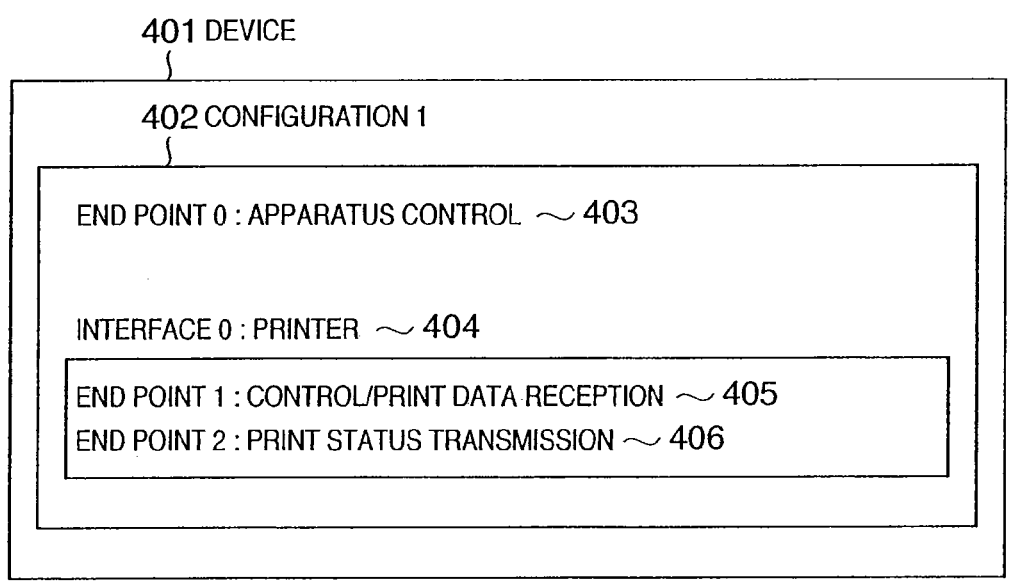
FIG. 4 is a conceptual view showing a USB configuration of a printing unit according to the first embodiment of the present invention.

FIG. 4 is a conceptual view showing a configuration of the printing unit 115, the expression of the configuration is compliant with the USB communication standard, according to the first embodiment of the present invention.

A device 401 represented by the largest frame can be defined solely in the USB communication standard, and indicates an attribute of the entire apparatus. The apparatus mentioned herein corresponds to the printing unit 115. The attribute of the device 401 is expressed by a device descriptor, which includes an apparatus manufacturer ID, a product ID, a release number, the number of configurations and so forth. In the first embodiment, the number of configurations is "1".

In the device 401, only one configuration (configuration 1 (402)) is defined. An attribute of the configuration 1 (402) is expressed by a configuration descriptor, which includes the number of interfaces in the configuration. In the first embodiment, the number of interfaces is "1".

Accordingly, in the configuration 1 (402), only one interface (interface 0 (404)) is defined. An attribute of the interface 0 (404) is expressed by an interface descriptor, which includes the number of end points in the interface, a class code and so forth. In the first embodiment, the number of end points in the interface 0 (404) used for printing is "2".

Accordingly, in the interface 0 (404) used for printing, two end points (end points 1 and 2 (405, 406)) are defined. Attributes of the end points 1 and 2 (405, 406) are expressed by an end point descriptor, which includes an end point number of the end point, a communication direction, the type of transfer, a packet size and so forth. The end point 1 (405) is used mainly for receiving control data and print data. The end point 2 (406) is used mainly for transmitting a received print status of print data. Further, the end point 0 (403) is a logical channel for control used for acquiring each of the aforesaid descriptors, for instance.

Figure 5:
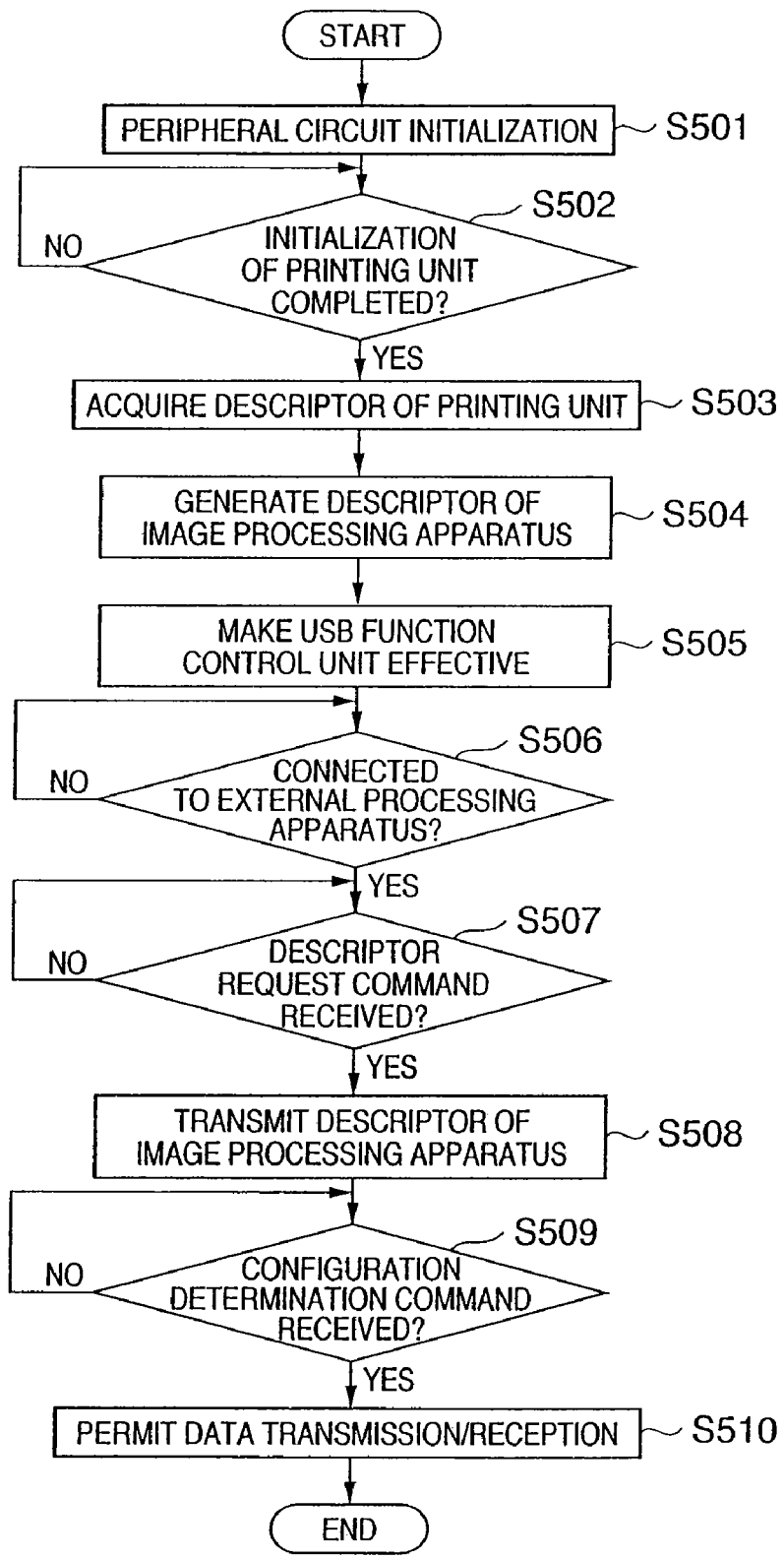
FIG. 5 is a flowchart describing initialization process operation of the image processing apparatus according to the first embodiment of the present invention.

Next, an initialization processing of the image processing apparatus 100, having the above-described construction, is described in detail with reference to the flowchart in FIG. 5. Note that the initialization processing is executed by the CPU 101.

When the power of the image processing apparatus 100 is turned on, in step S501, initialization of the peripheral circuits connected with the CPU bus 121 is performed.

Next in step S502, it is determined whether or not initialization of the printing unit 115, controlled by another CPU (not shown) different from the CPU 101, has been completed. If YES, the control proceeds to step S503. If NO, step S502 is repeated. Completion of initialization of the printing unit 115 can be detected by a USB interface of the USB host control unit 114. Alternatively, it can also be detected by directly connecting the CPU 101 and printing unit 115 with a monitoring line.

In step S503, the CPU 101 acquires data indicative of the apparatus configuration of the printing unit 115, which is detected by the USB host control unit 114, and transmits an apparatus configuration determination command (Set_Configuration command) to the printing unit 115 to be activated. For the data acquisition of apparatus configuration of the printing unit 115, the USB interface is employed. The apparatus configuration data is transmitted or received via a logical channel of the end point 0 (403) shown in FIG. 4, which is used for apparatus controlling. The apparatus configuration data of the printing unit 115 includes the above-described device descriptor, configuration descriptor, interface descriptor, end point descriptors (1, 2) and so on, and further includes character strings representing a manufacturer of the printing unit 115, a product name, a serial number and so on. For transmitting the apparatus configuration determination command to the printing unit 115, the USB interface is employed. The transmission data of the apparatus configuration determination command is transmitted via the logical channel of the end point 0 (403) shown in FIG. 4, which is used for apparatus controlling. By executing the foregoing step at the time of power-on initialization of the image processing apparatus 100, it is possible to assure initialization of the image processing apparatus 100. Moreover, when the apparatus configuration data of the entire image processing apparatus 100 is informed to the processing apparatus 200 (to be described later), it is possible to respond quickly to an apparatus configuration data acquisition command transmitted from the processing apparatus 200.

In step S504, apparatus configuration data of the entire image processing apparatus 100 is generated. The apparatus configuration data is transmitted or received via a logical channel of the end point 0 (303) shown in FIG. 3, which is used for apparatus controlling. The apparatus configuration data of the entire image processing apparatus 100 includes the above-described device descriptor, configuration descriptor, interface descriptors (0 to 2), end point descriptors (1 to 8) and so on, and further includes a character string representing a manufacturer of the entire image processing apparatus 100, a product name character string, a serial number character string and so on.

As a part of the apparatus configuration data of the entire image processing apparatus 100, the part of the apparatus configuration data of the printing unit 115 acquired in step S503 is used. For instance, the interface descriptor 0 (304) used for a printer, shown in FIG. 3, is formed to have the same configuration of the interface descriptor received from the printing unit 115 in step S503, so that print data transmitted from the processing apparatus 200 to the image processing apparatus 100 through the USB interface can be transferred to the printing unit 115 through the USB interface without a change, or print status data transmitted from the printing unit 115 to the USB host control unit 114 through the USB interface can be transferred to the processing apparatus 200 through the USB interface without a change.

By performing the aforementioned control, it is possible to configure the image processing apparatus 100 independent of the type of printing unit 115. More specifically, even in a case where the printing unit 115 is changed to a latest printing unit, the processing steps shown in the flowchart in FIG. 5 need not be changed.

In step S505, to permit communication between the image processing apparatus 100 and processing apparatus 200, the USB function control unit 113 is shifted to a communication effective state. By this stage, initialization of the entire image processing apparatus 100 ends, and the apparatus holds an event-wait state during standby.

In step S506, it is determined whether or not the image processing apparatus 100 is connected with the processing apparatus 200. If YES, the control proceeds to step S507. If NO, step S506 is repeated. The detection of the connection between the image processing apparatus 100 and processing apparatus 200 can be performed by a USB interface of the USB function control unit 113.

In step S507, it is determined whether or not an apparatus configuration data acquisition command (e.g., Get_Device- _Descriptor command, Get_Configuration_Descriptor command, Get_String_Descriptor command, Get_Device_ID command) is received from the processing apparatus 200 which is connected with the image processing apparatus 100. If YES, the control proceeds to step S508. If NO, step S507 is repeated.

In step S508, the CPU 101 informs the processing apparatus 200 of the apparatus configuration data of the entire image processing apparatus 100, which is generated in step S504. The apparatus configuration data is transmitted via the logical channel of the end point 0 (303) shown in FIG. 3, which is used for apparatus controlling.

In step S509, it is determined whether or not the image processing apparatus 100 has received an apparatus configuration determination command (Set_Configuration command) from the processing apparatus 200. If YES, the control proceeds to step S510. If NO, step S509 is repeated. The apparatus configuration determination command is received via the logical channel of the end point 0 (303) shown in FIG. 3, which is used for apparatus controlling.

In step S510, the image processing apparatus 100 makes the apparatus configuration (configuration) usable, and shifts to a print-data-reception standby state.

At this stage, if there is an error of some kind in the printing unit 115, such as no ink, no toner, no printing paper, paper jamming or the like, and the printing unit 115 is not ready to receive the print data, the USB function control unit 113 and processing apparatus 200 are set in the state where print data reception is not ready. For instance, if the printing unit 115 detects a crucial error within the printing unit 115 at the time of initializing the printing unit 115 in step S502, the printing unit 115 sets the state where print data cannot be received. The CPU 101, which detects this state through the USB host control unit 114 in step S503, sets the USB function control unit 113 in step S504 in the state where print data reception is not ready, and informs the processing apparatus 200 of this state in step S508. By virtue of this control, the processing apparatus 200 can be informed that the printing unit 115 is not ready to receive print data. Accordingly, since the print data from the processing apparatus 200 is no longer stored and retained in the image memory 104, operation troubles can be prevented.

Moreover, also in a case where a similar error occurs in the printing unit 115 in a standby state after initialization or after completion of printing operation, the state where print data reception is not ready is set in the USB function control unit 113 to achieve the similar effect.

Furthermore, the above description also applies to a case where the printing unit 115 is not ready to transmit data indicative of print status. If there is an error of some kind in the printing unit 115, such as no ink, no toner, no printing paper, paper jamming or the like, and the printing unit 115 is not ready to transfer the data indicative of print status, the USB function control unit 113 and processing apparatus 200 are set in the state where print-status-data transfer is not ready. For instance, if the printing unit 115 detects a crucial error within the printing unit 115 at the time of initializing the printing unit 115 in step S502, the printing unit 115 sets the state where data indicative of print state cannot be transferred. The CPU 101, which detects this state through the USB host control unit 114 in step S503, sets the USB function control unit 113 in step S504 in the state where print-status-data transfer is not ready. By virtue of this control, even in a case where a transfer request of the data indicative of print status is transmitted by the processing apparatus 200, the processing apparatus 200 can be informed that the printing unit is not ready to transfer data indicative of print status by returning the state where print-status-data transfer is not ready to the processing apparatus 200. Accordingly, operation troubles in the processing can be prevented.

Moreover, also in a case where a similar error occurs in the printing unit 115 in a standby state after initialization or after completion of printing operation, the state where print-status-data transfer is not ready is set in the USB function control unit 113 to achieve the similar effect.

Note that steps S503 and S504 are not necessarily performed immediately after step S502. For instance, processing of steps S503 and S504 may be performed immediately after the connection between the image processing apparatus 100 and processing apparatus 200 is confirmed in step S506. In this case, it is possible to reduce the power-on initialization processing of the image processing apparatus 100, thereby reduce the time lag between the power-on and apparatus-ready state of the image processing apparatus 100.

Alternatively, steps S503 and S504 may be performed immediately after the apparatus configuration data acquisition command is received from the processing apparatus 200 connected with the image processing apparatus 100 in step S507. In this case, until the apparatus configuration data acquisition command is received, it is not necessary to acquire apparatus configuration data of the printing unit 115 or generate apparatus configuration data of the entire image processing apparatus 100. Accordingly, an algorithm of the control program can be simplified.

Furthermore, in step S503, the acquisition of the apparatus configuration data from the printing unit 115 and transmission of the apparatus configuration determination command to the printing unit 115 are not necessarily performed simultaneously. For instance, the transmission of the apparatus configuration determination command to the printing unit 115 may be executed at the timing that print data is received from the processing apparatus 200. In this case, by virtue of separately performing the acquisition of the apparatus configuration data from the printing unit 115 and the transmission of the apparatus configuration determination command to the printing unit 115, an effect of clarified algorithm of the control program can be expected.

Next, printing operation of the image processing apparatus 100 is described in detail with reference to FIGS. 6 to 9.

Figure 6:
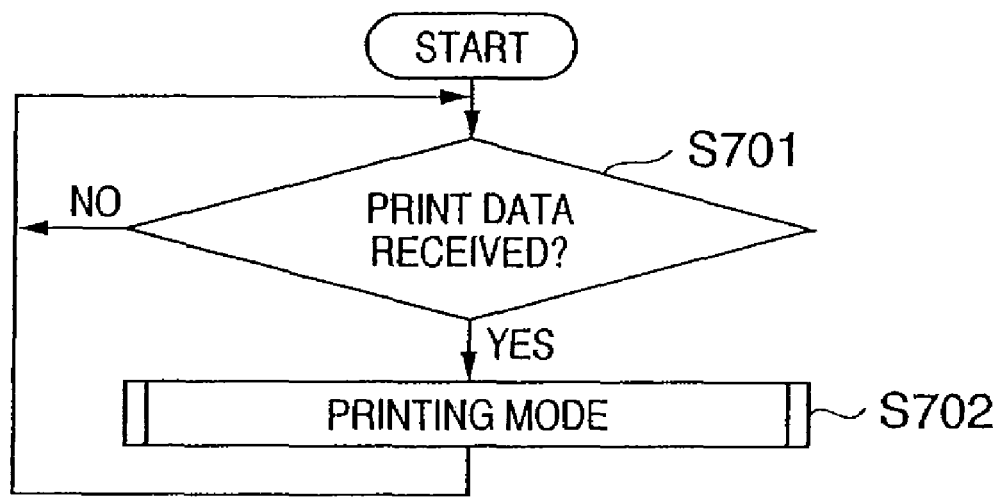
FIG. 6 is a flowchart describing print-operation start procedure according to the first embodiment of the present invention.

FIG. 6 is a flowchart describing print-operation start of the image processing apparatus 100, which is executed by the CPU 101.

First, in step S701, it is determined whether or not the image processing apparatus 100 has received print data from the processing apparatus 200. If YES, the control proceeds to step S702. If NO, step S701 is repeated. The print data is received via a logical channel of the end point 1 (305) shown in FIG. 3, which is used for receiving control data and print data. Furthermore, the print data is received in a packet form, delimited in a predetermined length.

In step S702, the image processing apparatus 100 shifts to a printing mode for printing the print data received from the processing apparatus 200. Details of the printing mode will be described later. When the printing mode is completed, the image processing apparatus 100 shifts again to the standby state for receiving print data from the processing apparatus 200.

Figure 7:
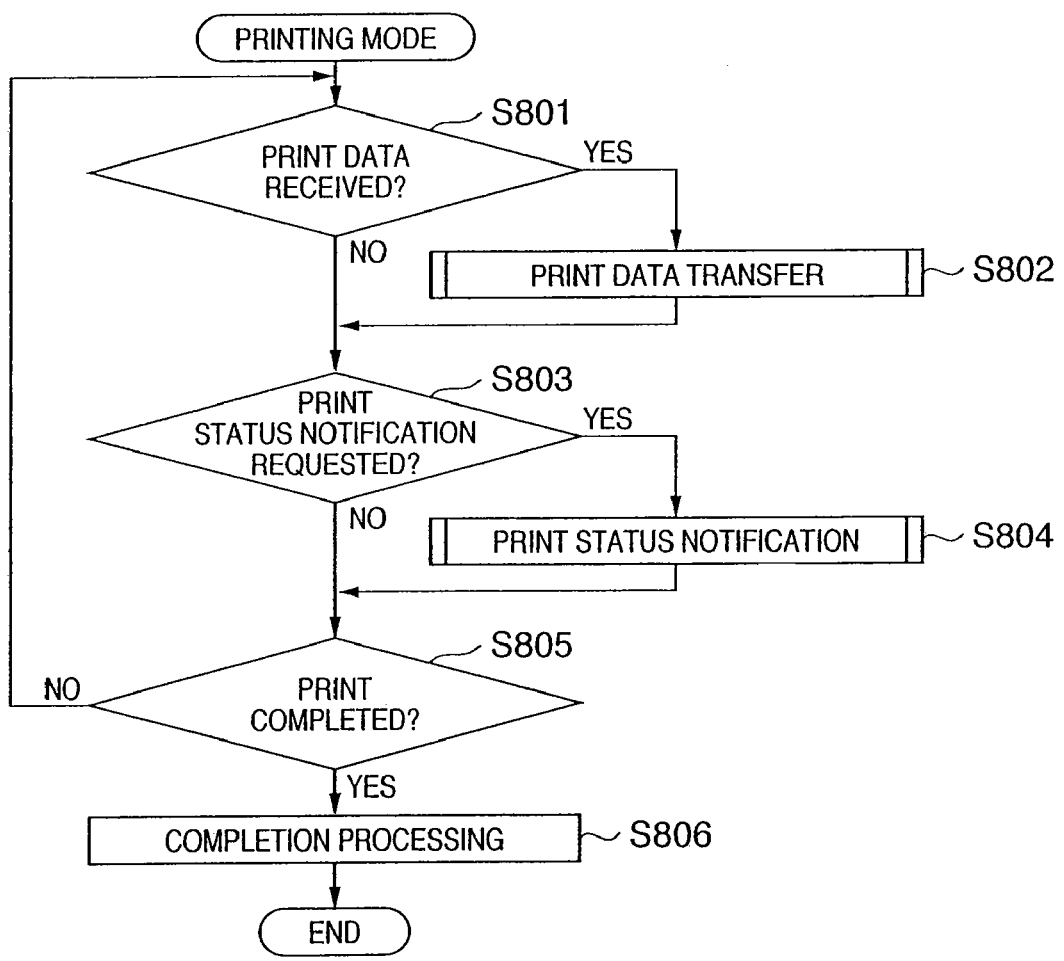
FIG. 7 is a flowchart describing printing operation according to the first embodiment of the present invention.

FIG. 7 is a flowchart describing printing operation of the image processing apparatus 100, which is executed by the CPU 101, in the printing mode shown in step S702 of FIG. 6.

First, in step S801, it is determined whether or not the image processing apparatus 100 has received print data from the processing apparatus 200. If YES, the control proceeds to step S802. If NO, the control proceeds to step S803. The print data is received via the logical channel of the end point 1 (305) shown in FIG. 3, which is used for receiving control data and print data. The received print data is temporarily stored in the image memory 104 of the image processing apparatus 100. Furthermore, the print data is received in a packet form, delimited in a predetermined length.

In step S802, the image processing apparatus 100 transfers the print data, received from the processing apparatus 200 and stored in the image memory 104, to the printing unit 115. Details of the print data transfer will be described later. Upon completion of the processing in step S802, the control proceeds to step S803.

In step S803, it is determined whether or not the image processing apparatus 100 has received a print status notification request from the processing apparatus 200. If YES, the control proceeds to step S804. If NO, the control proceeds to step S805. The print status notification request is received via a logical channel of the end point 2 (306) shown in FIG. 3, which is used for transmitting a print status. Note the reception of the print status notification request is not reception of actual data, but is reception of an IN packet compliant with the USB communication standard.

In step S804, the image processing apparatus 100 receives data indicative of print status from the printing unit 115, and transfers the received data indicative of print status to the processing apparatus 200. Details of the print-status-data transfer will be described later. Upon completion of the processing in step S804, the control proceeds to step S805.

In step S805, it is determined whether or not print data from the processing apparatus 200 has ended. If YES, the control proceeds to step S806. If NO, the control returns to step S801. The end of print data from the processing apparatus 200 can be detected by analyzing only a part of the data indicative of print status, which is acquired in step S804, and determining whether printing operation is in progress or completed. Herein, the data indicative of print status is a series of character strings representing whether printing of the printing unit 115 is in progress or completed, the residual amount of toner or ink in the printing unit 115, a print error state of the printing unit 115, the remaining amount of memory in the printing unit 115 and so forth. Analyzing a part of the data indicative of print status indicates the following processing. Namely, only a character string indicative of whether printing of the printing unit 115 is in progress or completed is extracted from the data indicative of print status of the printing unit 115 (a series of character strings representing whether printing of the printing unit 115 is in progress or completed, the residual amount of toner or ink in the printing unit 115, a print error state of the printing unit 115, the remaining amount of memory in the printing unit 115 and so forth), which is temporarily stored in the image memory 104 of the image processing apparatus 100, and analyzed as to whether the printing is in progress or completed. Herein, the data indicative of print status of the printing unit 115 is not analyzed entirely. According to this determination method, since data indicative of print status is not entirely analyzed, but only a character string indicative of whether printing of the printing unit 115 is in progress or completed is extracted and analyzed, it is possible to assure detection of print completion while reducing a processing load of the CPU 101.

Note that the print data end detection method is not limited to the above-described method but, for instance, the following method is available. More specifically, print data from the processing apparatus 200 is normally transmitted in a packet having a predetermined fixed length. For instance, it is often the case that 64 bytes are used as a transfer unit. However, print data from the processing apparatus 200 does not always have a data length which is exactly divisible by 64 bytes. In this case, the last packet of the print data from the processing apparatus 200 is naturally a short packet having less than 64 bytes. For instance, assume that a print data length is 100,000 bytes and a normally used packet length is 64 bytes. Dividing the total print data length 100,000 bytes by the packet length 64 bytes results in quotient 1,562 with remainder 32. Therefore, the CPU 101 transfers 1,562 64-byte packets and one short 32-byte packet. By detecting the last short packet, the end of print data can be detected. Furthermore, there may be a case where the total print data length is exactly divisible by 64 bytes. In this case, it is a general practice to transfer a null packet having 0 data length after all the print data is transferred. By detecting the null packet, the CPU 101 is able to detect the end of print data even in a case where the total print data length is exactly divisible by 64 bytes. According to this determination method, by merely monitoring a packet length of print data from the processing apparatus 200, it is possible to assure detection of print completion, and a simplified processing program can be expected.

Alternatively, the following print data end detection method is possible. More specifically, referring to FIG. 7, when print data reception ends, the control no longer proceeds to step S802. The number of times the control directly proceeds from step S801 to S803 consecutively is counted, and when the counted number exceeds a predetermined value, the end of print data can be determined. According to this determination method, by merely counting the number of times the control directly proceeds from step S801 to S803 and determining whether or not a predetermined number of times has been counted, it is possible to assure detection of print completion, and a simplified processing program can be expected.

Furthermore, the following print data end detection method is possible. More specifically, referring to FIG. 7, when print data reception ends, the control no longer proceeds to step S802. The time period the control directly proceeds from step S801 to S803 consecutively is timed, and when the time period exceeds a predetermined time period, print data end can be determined. According to this determination method, by merely timing the time period the control directly proceeds from step S801 to S803 and determining whether or not a predetermined time period has lapsed, it is possible to assure detection of print completion, and a simplified processing program can be expected.

When print completion is determined in step S805, the control proceeds to step S806 where print-operation completion processing is performed. Print-operation completion processing includes discharging a printing material outside the apparatus, sounding print-operation completion alarm from a speaker (not shown), informing print-operation completion by the operation display unit 108 or display unit 208, and so forth.

Figure 8:
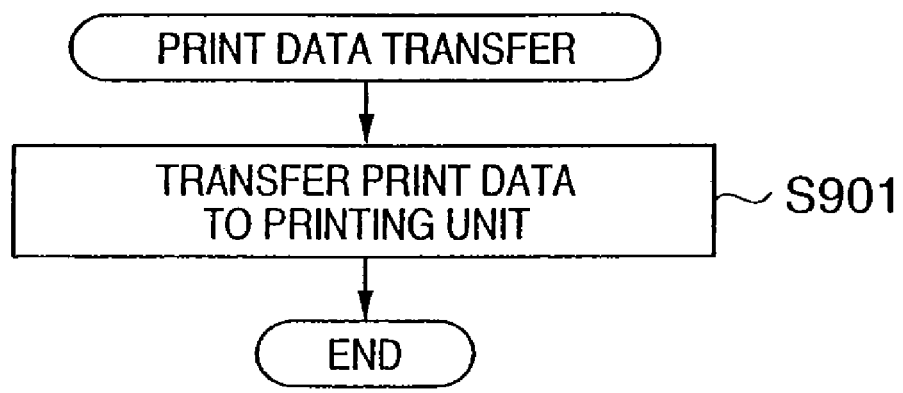
FIG. 8 is a flowchart describing transfer processing of print data according to the first embodiment of the present invention.

FIG. 8 is a flowchart describing print data transfer processing of the image processing apparatus 100 executed by the CPU 101, which is performed in step S802 in FIG. 7.

In step S901, the print data received in step S801 is transferred to the printing unit 115. The CPU 101 temporarily stores in the image memory 104 of the image processing apparatus 100 the print data received via the logical channel of the end point 1 (305) shown in FIG. 3, which is used for receiving control data and print data, and transfers the data to a logical channel of the end point 1 (405) shown in FIG. 4, which is used for receiving control data and print data. At this stage, the CPU 101 transfers the print data as it is, without performing any editing or processing on the content of the print data transferred from the end point 1 (305) to the end point 1 (405). The print data is transferred in a packet form, delimited in a predetermined length. Note that the interface 0 (304) in the device 301 shown in FIG. 3 and interface 0 (404) in the device 401 shown in FIG. 4 are employed so that one can assume the other does not exist. More specifically, processing of the printer driver software installed in the processing apparatus 200 is not at all different from the case where the processing apparatus 200 is directly connected with the printing unit 115 through a USB interface. Therefore, in a case where the printing unit 115 is changed to a different one, the printer driver software for the changed printing unit can be used without a change.

Figure 9:
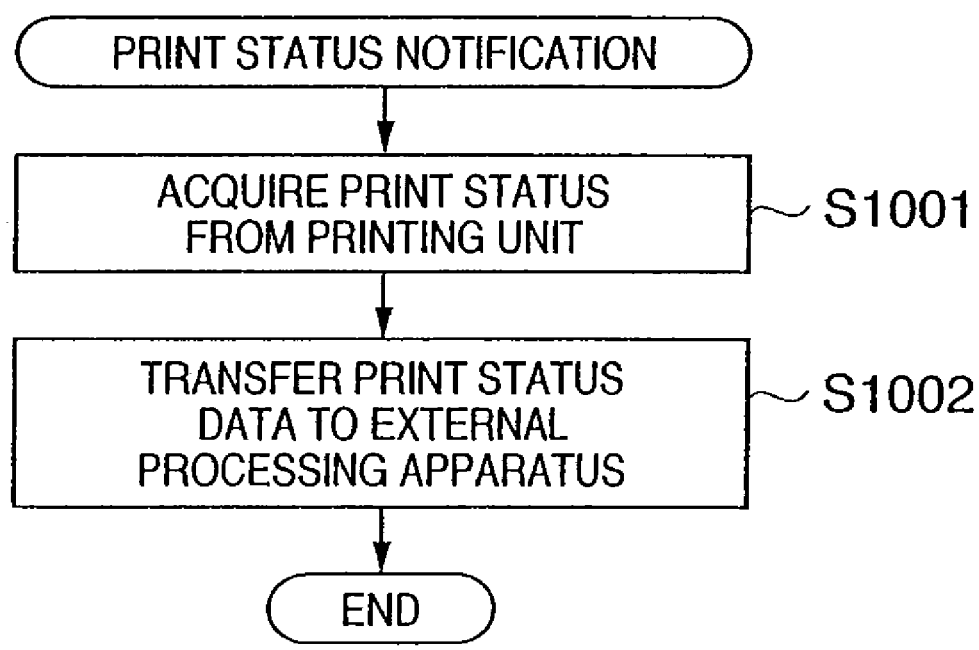
FIG. 9 is a flowchart describing transfer processing of print status data according to the first embodiment of the present invention.

FIG. 9 is a flowchart describing print-status-data transfer processing of the image processing apparatus 100 executed by the CPU 101, which is performed in step S804 in FIG. 7.

In step S1001, the CPU 101 acquires data indicative of print status from the printing unit 115 by controlling the USB host control unit 114. The data indicative of print status is acquired via the logical channel of the end point 2 (406) shown in FIG. 4, which is used for transmitting a print status. The acquired data indicative of print status is temporarily stored in the image memory 104 of the image processing apparatus 100. Note that the acquired data indicative of print status has a packet form delimited in a predetermined length.

In step S1002, the CPU 101 transmits the data indicative of print status, which is temporarily stored in the image memory 104 of the image processing apparatus 100, to the logical channel of the end point 2 (306) shown in FIG. 3 which is used for transmitting a print status. At this stage, the CPU 101 transfers the data indicative of print status as it is, without performing any editing or processing on the content of the data indicative of print status which is transferred from the end point 2 (406) to the end point 2 (306). Furthermore, at this stage, by analyzing a part of the data indicative of print status which is temporarily stored in the image memory 104 of the image processing apparatus 100, print completion can be detected to be used for the print completion determination in step S805 in FIG. 7. The print status data is transferred in a packet form, delimited in a predetermined length. Note that the interface 0 (404) in the device 401 shown in FIG. 4 and interface 0 (304) in the device 301 shown in FIG. 3 are employed so that one can assume the other does not exist. More specifically, processing of the printer driver software installed in the processing apparatus 200 is not at all different from the case where the processing apparatus 200 is directly connected with the printing unit 115 through a USB interface. Therefore, in a case where the printing unit 115 of other products is changed to a different one, the printer driver software for the changed printing unit can be used without a change.

Although the first embodiment has described a case where the printing unit is connected to the USB host control unit 114 by using a unique USB interface, the present invention is not limited to a printing unit. In place of the printing unit, by similarly connecting a reading unit for reading an original document, an image sensing unit such as a digital camera for sensing an object, or a communication unit for transmitting/receiving data to/from an external apparatus through a communication line, and performing the similar processing, the similar effects can be expected.

As has been described above in detail, by virtue of adopting physical interfaces compliant with the USB standard between a data processing terminal and a facsimile apparatus and providing a plurality of logical channels (USB composite device) compliant with the USB standard, great effects can be expected in a case where a data processing terminal controls a multi-function apparatus integrally having a plurality of functions, such as a printer, scanner, facsimile communication and so forth. More specifically, by providing a plurality of logical channels, it is possible to simultaneously operate the plurality of functions, and sufficiently take advantage of the merit of the multi-function apparatus.

Furthermore, the following workload is reduced as simultaneous operation need not be forced. In a data processing terminal, it is no longer necessary to add header information, which specifies a function, such as a printer, scanner, digital camera, facsimile communication or the like, to the head of an intended control command, edit and packet the data, and transmit the packeted data to the multi-function apparatus. For this reason, great effects can be expected in terms of a workload for altering a driver which is installed in a data processing terminal, complexity of the control, and a throughput.

Moreover, in the multi-function apparatus which does not receive packeted data from the data processing terminal, it is no longer necessary to analyze the packeted data to specify whether the data is related to a printer, scanner, or facsimile communication. In addition, it is no longer necessary to delete and edit the header information added to the head of the control command. For this reason, great effects can be expected in terms of complexity of the control and a throughput.

Furthermore, by virtue of adopting the physical interfaces compliant with the USB standard also in the main control unit and printing unit in the facsimile apparatus, it is no longer necessary to provide other physical interfaces besides the USB interface. Therefore, reduction of steps in designing the apparatus, easy diversion, and improved data transmissivity can be greatly expected.

Moreover, in a case where the printing unit only is changed to a latest printing unit, the control processing of the image processing apparatus need not be changed.

Furthermore, in a case where the printing unit only is changed to a latest printing unit, the printer driver software corresponding to the latest printing unit can be used without a change.

Moreover, even in a case where a crucial error occurs in the printing unit, operation troubles of an external processing apparatus can be prevented.

Furthermore, when printing operation is performed from an external processing apparatus, print completion of the printing unit can be detected with simple control processing.

Second Embodiment

Next, the second embodiment of the present invention will be explained.

Figure 10:
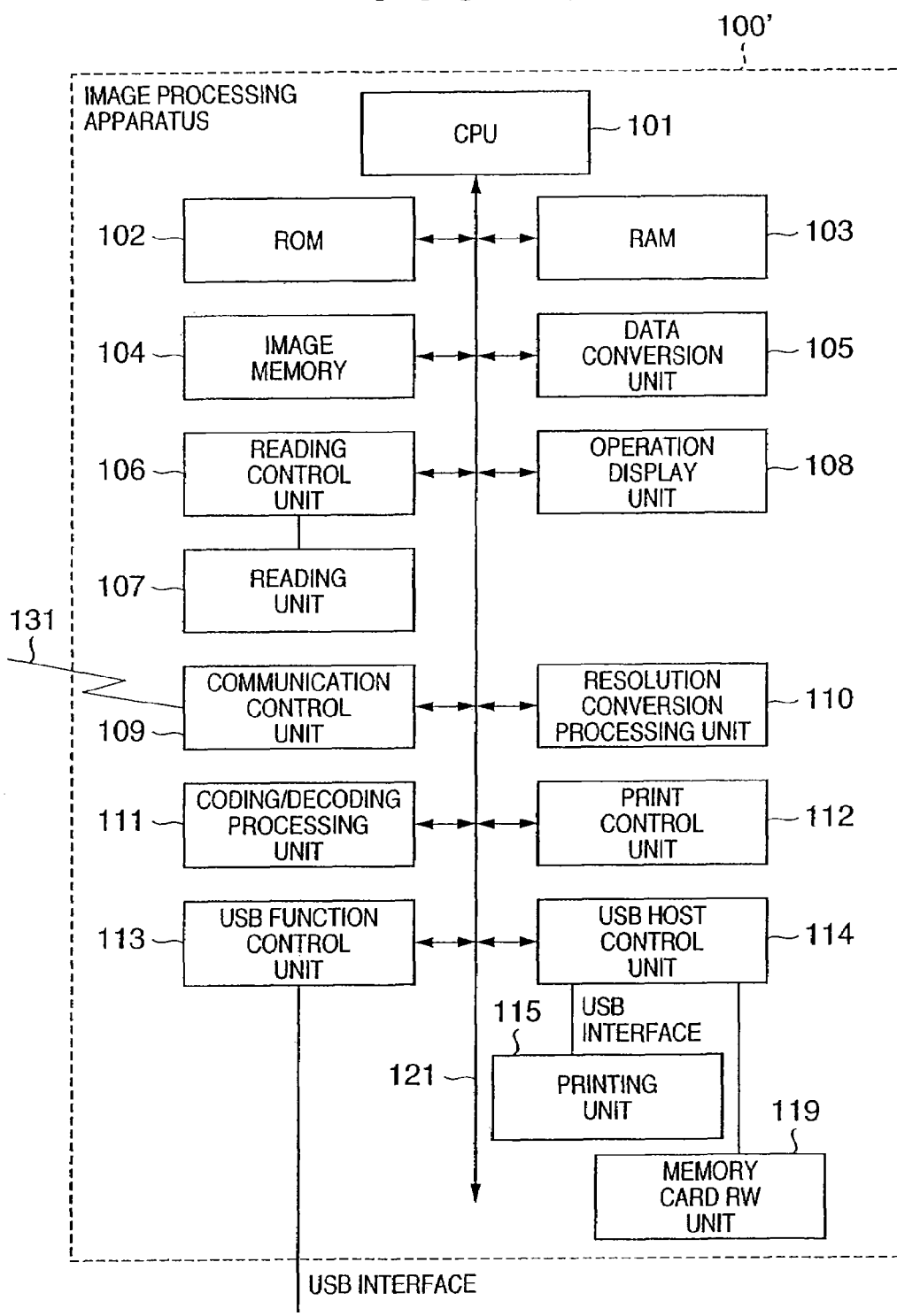
FIG. 10 is a block diagram showing a construction of an image processing apparatus according to a second embodiment of the present invention.

FIG. 10 shows a brief construction of an image processing apparatus 100', which constitutes an image processing system according to a second embodiment of the present invention. Referring to FIG. 10, a memory card RW (read/write) unit 119 is added to the construction shown in FIG. 1. In FIG. 10, the same units and elements as those in FIG. 1 are referred by the same reference numerals, and explanation of those are omitted.

The memory card RW unit 119, which is controlled by a dedicated CPU (not shown), can write data received via an USB interface and read data to/from a recording medium such as a memory card (e.g., compact flash card (trademark) and smart media card) on which flash memory is mainly mounted. The memory card RW unit 119 communicates with the USB host control unit 114 according to a protocol defined in the USB communication standard. Particularly, the memory card RW unit 119 serves as the function.

In the second embodiment, two kinds of units, namely the printing unit 115 and the memory card RW unit 119, are connected with the USB host control unit 114, and thus a USB interface forms a one-to-two connection. In the connection between the USB host control unit 114 and the printing unit 115, two logical channels compliant with the USB communication standard are prepared, one of which is used for image data transmission from the USB host control unit 114 to the printing unit 115, and the other is used for status information transmission from the printing unit 115 to the USB host control unit 114. In addition, a logical channel for control, which is required in the USB communication standard, is also prepared.

As for the connection between the USB host control unit 114 and the memory card RW unit 119, two logical channels for control compliant with the USB communication standard are prepared, one of which is used for transmission of a command and data to be written to a media (referred to as "write data", hereinafter) from the USB host control unit 114 to the memory card RW unit 119, and the other is used for transmission of status information and read data from the memory card RW unit 119 to the USB host control unit 114. In addition, a logical channel for control, which is required in the USB communication standard, is also prepared.

The components 101 to 106 and 108 to 114 are connected to each other through a CPU bus 121 controlled by the CPU 101.

Next, attribute information of the memory card RW unit 119 which is transmitted from the memory card RW unit 119 to the CPU 101 via the USB host control unit 114 is explained in detail. Note, since the construction of the printing unit 115 according to the USB communication standard is the same as that described in the first embodiment with respect to FIG. 4, the explanation of it is omitted.

Figure 11:
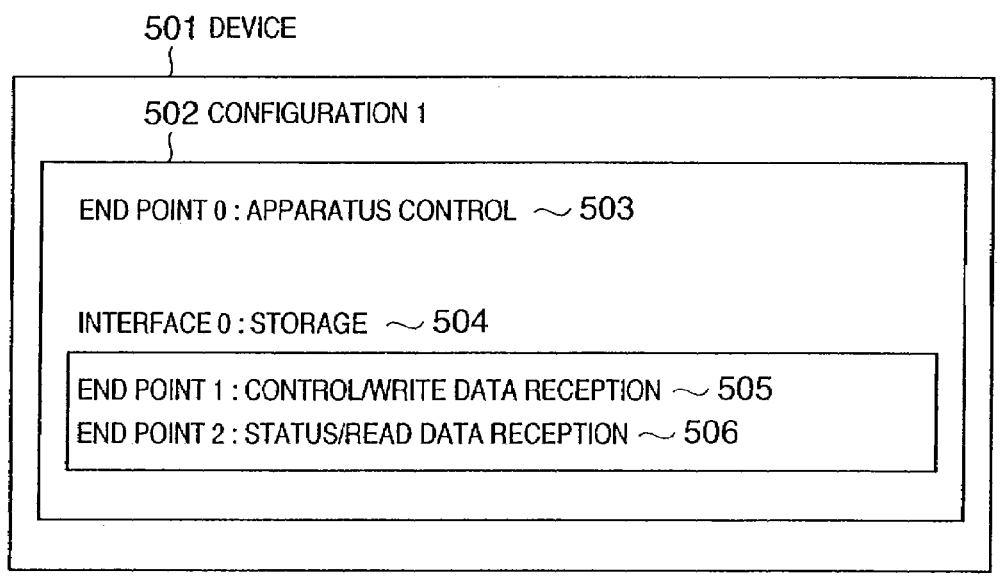
FIG. 11 is a conceptual view showing a USB configuration of a memory card RW unit according to the second embodiment of the present invention.

FIG. 11 is a conceptual view showing attribute information of the USB interface of the memory card RW unit 119 according to the second embodiment of the present invention.

A device 501 represented by the largest frame can be defined solely in the USB communication standard, and indicates an attribute of the entire apparatus. The attribute of the device 501 is expressed by a numerical string (will be described later in detail) of a device descriptor which includes an apparatus manufacturer ID, a product ID, a release number, the number of configurations and so forth. In the second embodiment, the number of configurations of the memory card RW unit 119 is "1".

In the device 501, only one configuration (configuration 1 (502)) is defined. An attribute of the configuration 1 (502) is expressed by a numerical string of a configuration descriptor, which includes the number of interfaces in the configuration. In the second embodiment, the number of interfaces is "1".

Accordingly, in the configuration 1 (502), only one interface (interface 0 (504)) is defined. An attribute of the interface 0 (504) is expressed by a numerical string of an interface descriptor, which includes the number of end points of the interface, a class code and so forth. In the second embodiment, the number of end points in the interface 0 (504) used for the memory card RW unit 119 is "2".

Accordingly, in the interface 0 (504) used for the memory card RW unit 119, two end points (end points 1 and 2 (505, 506)) are defined. Attributes of the end points 1 and 2 (505, 506) are expressed by numeral strings of an end point descriptor, which includes an end point number of the end point, a communication direction, the type of transfer, a maximum packet size and so forth. The end point 1 (505) is used mainly for receiving command data and write data. The end point 2 (506) is used mainly for transmitting status data and read data from the memory card RW unit 119 to the CPU 101. Further, the end point 0 (503) is used by the CPU 101 to acquire each of the aforesaid descriptors of the memory card RW unit 119, for instance.

Next, the numerical string of the device descriptor, which is attribute information of, e.g., the device 401 or 501 is described in detail.

FIG. 12 shows the numerical string of the attribute information, which is transmitted from the printing unit 115 or the memory card RW unit 119 to the CPU 101 via the USB host control unit 114, of a USB interface according to the second embodiment of the present invention.

The numerical string of a device descriptor has the total length of 18-byte, and is expressed in the hexadecimal system {12h, 01h, 00h, 02h, 00h, 00h, 00h, 40h, xxh, xxh, xxh, xxh, 00h, 01h, 01h, 02h, 03h, 01h}. xxh represents arbitrary one-byte data. "12h" of an offset 0 represents the total length of the device descriptor (1401). "01h" of an offset 1 represents a type of the descriptor (1402). In the device descriptor, it is fixed to "01h". "0200h" of offsets 2 and 3 represents the version number (1403, 1404) of the USB communication standard with which the device is compliant. In the second embodiment, the version number with which the device is compliant is USB 2.0. "00h" of an offset 4 represents a class code (1405) to support, which is usually fixed to "00h". "00h" of an offset 5 represents a subclass code (1406) to support, which is usually fixed to "00h". "00h" of an offset 6 represents a protocol (1407) to support, which is usually fixed to "00h". "40h" of an offset 7 represents the maximum packet size (1408) of the end point 0 (403 in FIG. 4 and 503 in FIG. 11). The USB communication standard adapts a packet communication method of dividing and transmitting data by packets. The end point 0 (403 in FIG. 4 and 503 in FIG. 11) shows the maximum packet size when the logical channel for control is used.

"xxxxh" of offsets 8 and 9 represents a manufacturer ID (1409, 1410). A unique number is assigned to each manufacturer by a group managing the USB communication standard. "xxxxh" of offsets 10 and 11 represents a product ID (1411, 1412). A manufacturer can assign a unique number to each product. "0100h" of offsets 12 and 13 represents a release number (1413, 1414). A manufacturer can decide a number for managing release of each product. "01h" of an offset 14 represents an index (1415) to a character string of the manufacturer name. "02h" of an offset 15 represents an index (1416) to a character string of a product name. "03h" of an offset 16 represents an index (1417) to a character string of a serial number. "01h" of an offset 17 represents the number (1418) of configurations in the device 401 of the printing unit 115 or the device 501 of the memory card RW unit 119.

Next, an initialization processing of the image processing apparatus 100' is described.

Figure 13:
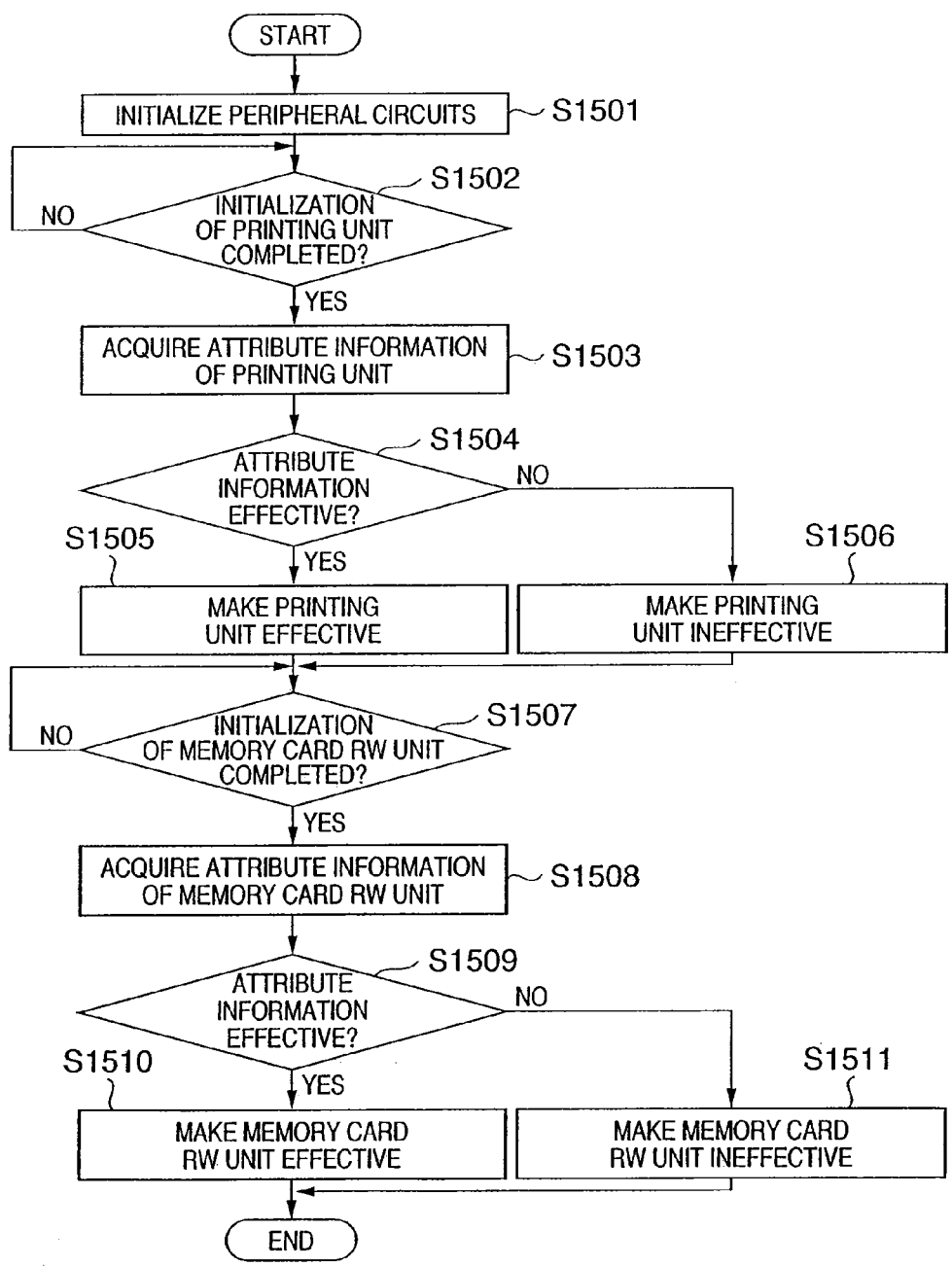
FIG. 13 is a flowchart describing initialization process operation of the image processing apparatus according to the second embodiment of the present invention.

FIG. 13 is a flowchart showing the initialization processing of the image processing apparatus 100' executed by the CPU 101 according to the second embodiment of the present invention.

When the power of the image processing apparatus 100' is turned on, in step S1501, initialization of the all peripheral circuits connected with the CPU bus 121 is performed.

Next in step S1502, it is determined whether or not initialization of the printing unit 115, controlled by another CPU (not shown) different from the CPU 101, has been completed. If YES, the control proceeds to step S1503. If NO, step S1502 is repeated. Completion of initialization of the printing unit 115 can be detected by a USB interface of the USB host control unit 114. Alternatively, it can also be detected by directly connecting the CPU 101 and printing unit 115 with a monitoring line.

In step S1503, the CPU 101 acquires attribute information of the printing unit 115 via the USB host control unit 114. For the attribute information acquisition of the printing unit 115, the USB interface is employed. The apparatus attribute information data is transmitted or received via a logical channel of the end point 0 (403) shown in FIG. 4, which is used for apparatus controlling. The data showing attribute information of the printing unit 115 includes the above-described device descriptor, configuration descriptor, interface descriptor, end point descriptors (1, 2) and so on, and further includes character strings representing a manufacturer of the printing unit 115, a product name, a serial number and so on.

In step S1504, whether or not the attribute information of the printing unit 115 obtained in step S1504 is effective is determined. If YES, the control proceeds to step S1505. If NO, the control proceeds to step S1506. Effectiveness of the attribute information is determined as follows. Namely, the CPU 101 extracts a numerical string of the product ID (1411, 1412) out of the numerical string (shown in FIG. 12) of the device descriptor of the printing unit 115 obtained in step S1503. The CPU 101 determines whether the attribute information of the connected printing unit 115 is effective or ineffective on the basis of the extracted product ID. Alternatively, the CPU 101 may further extract a numerical string of a release number (1413, 1414) out of the numerical string (shown in FIG. 12) of the device descriptor of the printing unit 115 obtained in step S1503 and determine whether the attribute information of the connected printing unit 115 is effective or ineffective on the basis of the product ID and the extracted release number of the printing unit 115.

If it is determined in step S1504 that the attribute information is effective, the CPU 101 makes the connected printing unit 115 effective in step S1505. "(to) Make the printing unit 115 effective" means that the CPU 101 performs in a process described later (shown in FIG. 14) transmission of print data to the printing unit 115 and acquisition of print status of the printing unit 115.

If it is determined in step S1504 that the attribute information is ineffective, the CPU 101 makes the connected printing unit 115 ineffective in step S1506. "(to) Make the printing unit 115 ineffective" means that the CPU 101 does not perform in the process described later (shown in FIG. 14) transmission of print data to the printing unit 115 and acquisition of print status of the printing unit 115.

Next in step S1507, it is determined whether or not initialization of the memory card RW unit 119, controlled by another CPU (not shown) different from the CPU 101, has been completed. If YES, the control proceeds to step S1508. If NO, step S1507 is repeated. Completion of initialization of the memory card RW unit 119 can be detected by a USB interface of the USB host control unit 114. Alternatively, it can also be detected by directly connecting the CPU 101 and memory card RW unit 119 with a monitoring line.

In step S1508, the CPU 101 acquires attribute information of the memory card RW unit 119 via the USB host control unit 114. For the attribute information acquisition of the memory card RW unit 119, the USB interface is employed. The attribute information of the device is transmitted or received via a logical channel of the end point 0 (503) shown in FIG. 11, which is used for apparatus controlling. The data showing attribute information of the memory card RW unit 119 includes the above-described device descriptor, configuration descriptor, interface descriptor, end point descriptors (1, 2) and so on, and further includes character strings representing a manufacturer name of the memory card RW unit 119, a product name, a serial number and so on.

In step S1509, whether or not the attribute information of the memory card RW unit 119 obtained in step S1508 is effective is determined. If YES, the control proceeds to step S1510. If NO, the control proceeds to step S1511. Effectiveness of the attribute information is determined as follows. Namely, the CPU 101 extracts a numerical string of the product ID (1411, 1412) out of the numerical string (shown in FIG. 12) of the device descriptor of the memory card RW unit 119 obtained in step S1508. The CPU 101 determines whether the attribute information of the connected memory card RW unit 119 is effective or ineffective on the basis of the extracted product ID. Alternatively, the CPU 101 may further extract a numerical string of a release number (1413, 1414) out of the numerical string (shown in FIG. 12) of the device descriptor of the memory card RW unit 119 obtained in step S1508 and determine whether the attribute information of the connected memory card RW unit 119 is effective or ineffective on the basis of the product ID and the extracted release number of the printing unit 115.

If it is determined in step S1509 that the attribute information is effective, the CPU 101 makes the connected memory card RW unit 119 effective in step S1510. "(to) Make the memory card RW unit 119 effective" means that the CPU 101 performs in a process described later (shown in FIG. 14) transmission of command and write data to the memory card RW unit 119 and acquisition of status and read data of/from the memory card RW unit 119.

If it is determined in step S1509 that the attribute information is ineffective, the CPU 101 makes the connected memory card RW unit 119 ineffective in step S1511. "(to) Make the memory card RW unit 119 ineffective" means that the CPU 101 does not perform in the process described later (shown in FIG. 14) transmission of command and write data to the memory card RW unit 119 and acquisition of status and read data of/from the memory card RW unit 119.

The initialization processing of the image processing apparatus 100' is completed after the foregoing processing.

Next, a processing sequence performed by the CPU 101 of the image processing apparatus 100' for the printing unit 115 and the memory card RW unit 119 is explained in detail with reference to FIG. 14.

Figure 14:
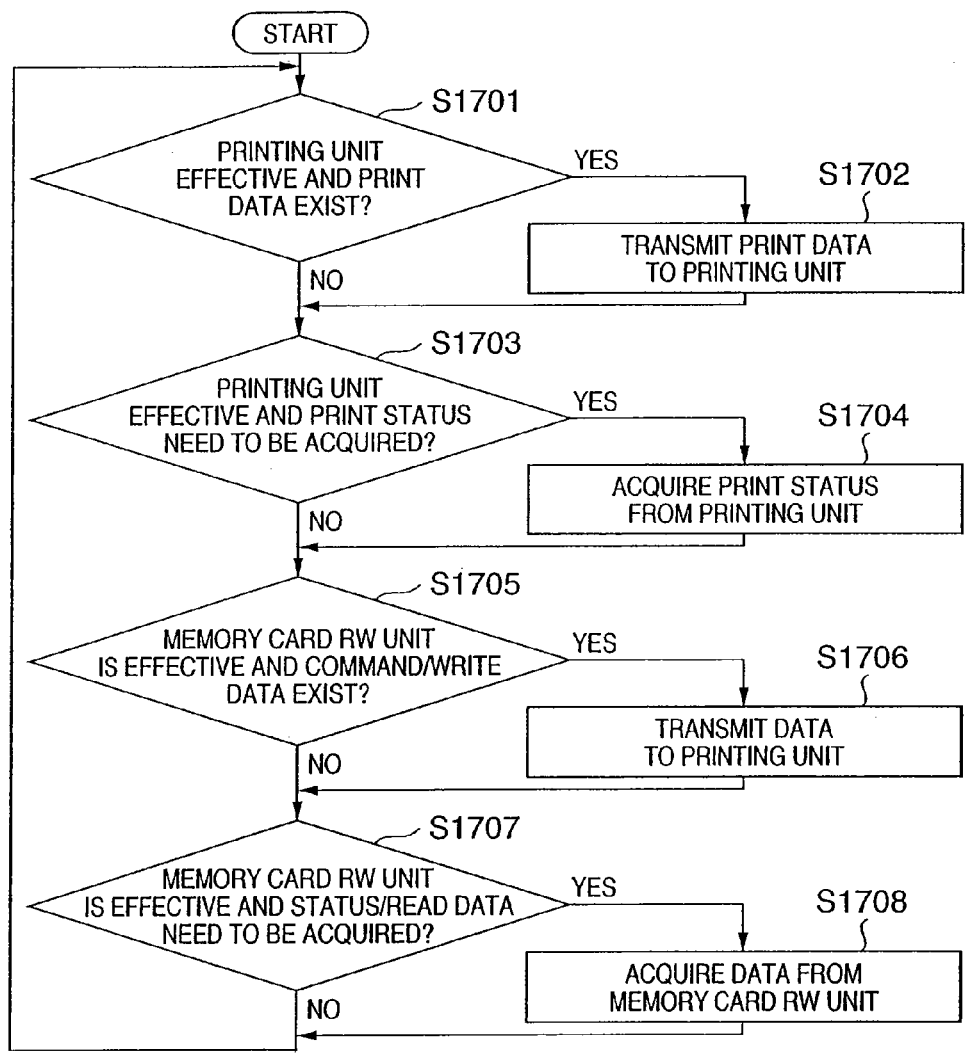
FIG. 14 is a flowchart describing processing operation of the image processing apparatus according to the second embodiment of the present invention.
Figure 15:
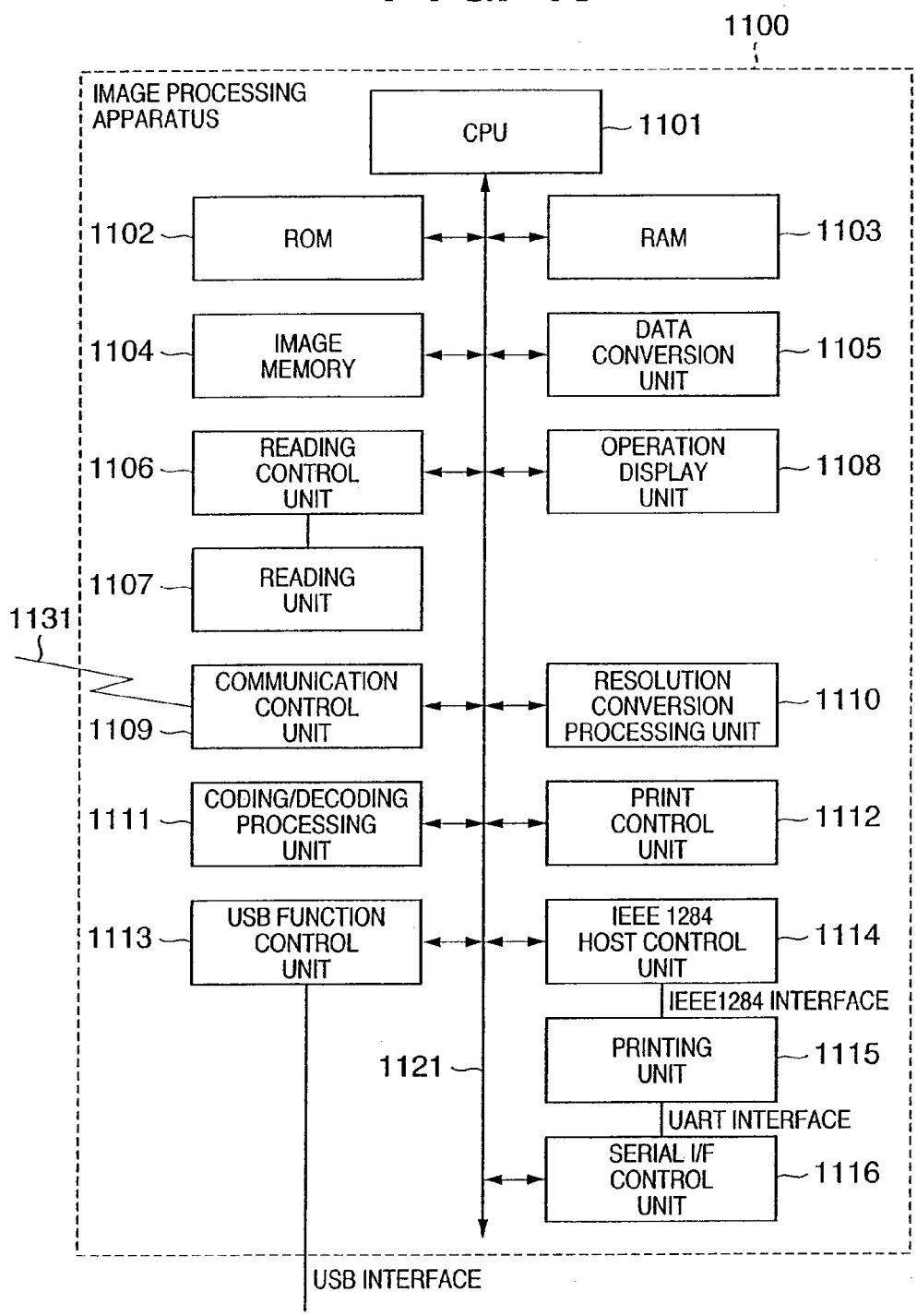
FIG. 15 is a block diagram showing a construction of a conventional image processing apparatus.

The flowchart in FIG. 14 shows an operation of a USB host control task executed under the control of the incorporated operating system, and the CPU 101 apparently performs a task or tasks other than the task shown in FIG. 14 in parallel by scheduling, using task switch, and/or interrupting under the control of the incorporated operating system.

When the operation of the USB host control task starts, the CPU 101 determines whether the printing unit 115 is effective and print data exists in step S1701. If YES, the control proceeds to step S1702. If NO, the control proceeds to step S1703. The CPU 101 decides the effectiveness of the printing unit 115 by the processes performed in steps S1504, S1505, and S1506.

As for determination of the existence of print data to be processed in the printing unit 115, the following method is used. First, a memory area for storing print data to be transmitted to the printing unit 115 is secured in the image memory 104 of the image processing apparatus 100'. Then, when the image processing apparatus 100' is performing copying operation processing, a read task governing a read operation controls the reading control unit 106 to convert read image of a document to print data, and puts the print data in the memory area secured for print data storage. Further, when the image processing apparatus 100' is performing facsimile receiving operation processing, a facsimile communication task governing a facsimile communication operation controls the communication control unit 109 to put image data received via facsimile in the memory area secured for print data storage. The CPU 101 detects whether or not the print data is in the memory area secured for print data storage, thereby determines whether or not print data to be transmitted to the printing unit 115 exists.

If it is determined in step S1701 that the printing unit 115 is effective and print data to the printing unit 115 exists, the CPU 101 controls the USB host control unit 114 to transmit the print data to the printing unit 115 in step S1702. Note, transmission of the print data to the printing unit 115 is performed as follows. When the CPU 101 recognizes the existence of the print data to be transmitted to the printing unit 115, the CPU 101 controls the USB host control unit 114 to transmit the print data in the memory area secured for print data storage to a logical channel of the end point 1 (405 in FIG. 4) of the printing unit 115 via the USB interface. The print data is divided into 64-byte packets, and delivered from the CPU 101 to the printing unit 115 by a communication unit compliant with the USB communication standard. Thereafter, the control proceeds to step S1703.

In step S1703, the CPU 101 determines whether the printing unit 115 is effective and the print status needs to be acquired from the printing unit 115. If YES, the control proceeds to step S1704. If NO, the control proceeds to step S1705. Determination of necessity of acquiring print status from the printing unit 115 is performed as follows, for instance. First, the CPU 101 executes a timer task which is scheduled under the control of the incorporated operating system. The timer task monitors a lapse of a predetermined period, and after the predetermined period has passed, the timer task notifies a USB host control task of the lapse of the predetermined period. If the USB host control task receives the notification, the CPU 101 determines that it is necessary to acquire print status of the printing unit 115.

If it is determined in step S1703 that the printing unit 115 is effective and acquisition of print status from the printing unit 115 is necessary, the CPU 101 controls the USB host control unit 114 to acquire print status from the printing unit 115 in step S1704. The acquisition of the print status from the printing unit 115 is performed as follows. When the CPU 101 determines that it is necessary to acquire print status from the printing unit 115, the CPU 101 controls the USB host control unit 114 to transmit a packet requesting print status to a logical channel of the end point 2 (406 of FIG. 4) of the printing unit 115 via the USB interface. As a response to the packet, the CPU 101 receives data representing print status of the printing unit 115. The data representing the print status is divided into 64-byte packets and delivered from the printing unit 115 to the CPU 101 by a communication unit compliant with the USB communication standard. Thereafter, the control proceeds to step S1705.

In step S1705, the CPU 101 determines whether the memory card RW unit 119 is effective and command or write data to be transferred to the memory card RW unit 119 exists. If YES, the control proceeds to step S1706. If NO, the control proceeds to step S1707. The CPU 101 decides the effectiveness of the memory card RW unit 119 by the processes performed in steps S1509, S1510, and S1511.

The determination of the existence of command or write data to the memory card RW unit 119 is performed as follows. First, a memory area for storing command and write data to be transmitted to the memory card RW unit 119 is secured in the image memory 104 of the image processing apparatus 100'. Then, when the image processing apparatus 100' is performing write operation processing of an read image to a memory card, a read task governing a read operation controls the reading control unit 106 to convert read image of a document to image data, and puts the image data in the memory area secured for command and write data storage. Further, when the image processing apparatus 100' is performing an operation of writing an image received via facsimile to a memory card, a facsimile communication task governing a facsimile communication operation controls the communication control unit 109 to put image data received via facsimile in the memory area secured for command and write data storage. The CPU 101 detects whether or not the image data is in the memory area secured for command and write data storage, thereby determines whether or not command or write data to the memory card RW unit 119 exists.

If it is determined in step S1705 that the memory card RW unit 119 is effective and command or write to the memory card RW unit 119 exists, the CPU 101 controls the USB host control unit 114 to transmit the command or write data to the memory card RW unit 119 in step S1706. Note, transmission of command or write data to the memory card RW unit 119 is performed as follows. When the CPU 101 recognizes the existence of the command or write data to the memory card RW unit 119, the CPU 101 controls the USB host control unit 114 to transmit the command or write data in the memory area secured for command and write data storage to a logical channel of the end point 1 (505 in FIG. 11) of the memory card RW unit 119 via the USB interface. The command or write data is divided into 64-byte packets, and delivered from the CPU 101 to the memory card RW unit 119 by a communication unit compliant with the USB communication standard. Thereafter, the control proceeds to step S1707.

In step S1707, the CPU 101 determines whether the memory card RW unit 119 is effective and the status or read data needs to be acquired from the memory card RW unit 119. If YES, the control proceeds to step S1708. If NO, the control returns to step S1701. Determination of necessity of acquiring status or read data from the memory card RW unit 119 is performed as follows, for instance. In the communication protocol between the CPU 101 and the memory card RW unit 119, it is the rule for the CPU 101 to obtain status or read data corresponding to command or write data after the CPU 101 transmits the write data or command data to the memory card RW unit 119 (step S1706). Therefore, after the process of step S1706 is performed, and if the CPU 101 has not acquired status or read data corresponding to write data or command, it is determined that the CPU 101 needs to acquire status or read data from the memory card RW unit 119.

If it is determined in step S1707 that the memory card RW unit 119 is effective and acquisition of status or read data from the memory card RW unit 119 is necessary, the CPU controls the USB host control unit 114 to acquire status or read data from the memory card RW unit 119 in step S1708. The acquisition of the status or read data from the memory card RW unit 119 is performed as follows. When the CPU 101 determines that it is necessary to acquire status or read data from the memory card RW unit 119, the CPU 101 controls the USB host control unit 114 to transmit a packet requesting status or read data to a logical channel of the end point 2 (506 of FIG. 11) of the memory card RW unit 119 via the USB interface. As a response to the packet, the CPU 101 receives data representing status or read data of/from the memory card RW unit 119. The data representing the status or read data is divided into 64-byte packets and delivered from the memory card RW unit 119 to the CPU 101 by a communication unit compliant with the USB communication standard. Thereafter, the control returns to step S1701.

In the second embodiment, a case of performing processing of the printing unit 115 and processing of the memory card RW unit 119 in time division is described, and this can expect following merits. As the image processing apparatus 100' according to the second embodiment is a composite machine having a reading function, a printing function, a communication function, a memory card write/read function, an interface function with an external information processing terminal, there are cases where simultaneous execution of two or more functions is desired, if possible. For example, if an operator operates to simultaneously designate the printing function, such as a copying operation, and the memory card RW function which refers to data in a memory card, it is ideal to accept both of the functions and run the functions in parallel. If the processes of the printing unit 115 and the memory card RW unit 119 are not performed in time division unlike the second embodiment, a copying operation and operation of referring to data in a memory card cannot be performed simultaneously, and it will be limited such that only either one of the functions which is designated first is executed. In contrast, by performing processes of the printing unit 115 and the memory card RW unit 119 in time division, the both designations of the copying operation and operation of referring to data in a memory card can be accepted and run in parallel.

Further, in the second embodiment, a case of performing processes of the printing unit 115 and processing of the memory card RW unit 119 in time division is described, however, either one of the processes may be given priority over the other. Alternatively, either one of the processes may be performed prior to the other depending upon the state of the image processing apparatus 100' and/or the state of memory. When either one of the processes is performed prior to the other, the following merits may be expected. For instance, when an operator operates to designate a printing function, such as copying function, and a memory card RW function of referring to data in a memory card, it is ideal that both of the functions are performed in parallel and completed in the shortest time period. If priority is not given to either of the processes of the printing unit 115 and the memory card RW unit 119 as described in the second embodiment, the operation of referring to data in the memory card whose transmission load of data is relatively light and which requires frequent waiting time for processing by the CPU 101 consumes large part of processing ability of the CPU 101. This prevents progress of the copying operation in which a relatively large amount of data needs to be transmitted. Especially, when a color copying is performed, delay of the process in the printing unit 115 affects color reproducibility of the color copy, and may cause a fatal defect. In contrast, if either of the processes of the printing unit 115 and the memory card RW unit 119 is performed prior to the other as in the second embodiment, when a copying operation and a referring operation of data in a memory card are to be performed simultaneously, respective processes can be performed in optimum conditions and operation quality of color copying, such as color reproducibility can be kept high.

According to the second embodiment as described above, since connection with a printing unit is complied with the high-speed USB interface, when a printing unit capable of high-speed printing is used, a main control unit can provide print data to the printing unit fast enough to be used in the printing. Thus, it is possible to make the best use of the ability of the printing unit. Further, since two-way USB interface is employed, the main control unit does not have to have a physical interface other than a one-way parallel communication interface for obtaining status information of the printing unit, such as print status. Furthermore, since a USB interface which allows multiple connection is utilized, when a read/write device for a detachable storage medium is employed in the image processing apparatus, there is no need to provide another physical interface.

In addition, since a USB interface which allows multiple connection is utilized, the image processing apparatus attains wider expansivity. Further, since a USB interface is a general purpose interface, the types of bus-interfaces are unified, which makes it easier to employ another device, especially peripheral devices (e.g., printing unit, reading unit, storage device, communication unit) which are often diverted from other products. This may shorten a development period of the image processing apparatus and reduce development cost.

Moreover, since the USB interface that can be collectively managed is employed, it becomes easier to disperse loads of peripheral processing units. More specifically, by performing the processes of the printing unit 115 and the memory card RW unit 119 in time division as described in the second embodiment, it is possible to accept and advance both of the processes in parallel. Further, by performing either one of the processes prior to the other as described in the second embodiment, when a copying operation and an operation of referring to data in the memory card are designated simultaneously, it is possible to advance each operation at the optimum conditions, which secures operation quality of, e.g., color reproducibility in color copying.

Further, in the second embodiment, when each of the printing unit 115 and the memory card RW unit 119 is effective, processing operation for each device is performed. Alternatively, if either of the printing unit 115 or the memory card RW unit 119 becomes ineffective, the ineffective one may be initialized again to overcome a trouble.

Further, in the second embodiment, the printing unit 115 and the memory card RW unit 119 are described; however, the present invention is not limited to a combination of a printing unit and a memory card RW unit. Alternatively, any combinations of, e.g., a reading unit, an image sensing unit such as a digital camera, and a communication unit may be used, and by applying the same operation, the similar effects can be expected.

Other Embodiment

The object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program. In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts in FIGS. 5 to 9 described in the first embodiment or FIGS. 13 and 14 described in the second embodiment.

The present invention is not limited to the above embodiments and various changes and modifications can be made within the spirit and scope of the present invention. Therefore to apprise the public of the scope of the present invention, the following claims are made.

What is claimed is:

1. A control method of an image processing apparatus, the image processing apparatus including (a) a data processing unit; (b) a first interface unit, having a plurality of logical channels, which is adapted to connect with an external processing apparatus; and (c) a second interface unit, having a logical channel that has a configuration different from the first interface unit, which is adapted to connect with the data processing unit, said method comprising:

controlling data transfer between the first interface unit and the second interface unit; and acquiring attribute information possessed by the data processing unit through the second interface unit;

integrating the acquired attribute information and attribute information for each of the plurality of logical channels provided in the first interface unit; and notifying the integrated attribute information.

2. A control method of an image processing apparatus, the image processing apparatus including (a) a data processing unit; (b) a first interface unit, having a plurality of logical channels, which is adapted to connect with an external processing apparatus; and (c) a second interface unit, having a logical channel that has a configuration different from the first interface unit, which is adapted to connect with the data processing unit, said method comprising:

controlling data transfer between the first interface unit and the second interface unit, wherein the first interface unit and the second interface unit are controlled so that an image data processing status is acquired from the data processing unit through the second interface unit, and the acquired processing status is transferred to the external processing apparatus through the logical channel, which is provided in the first interface unit, for the data processing unit.

3. The control method according to claim 2, wherein the processing status is transferred without a change.

4. The control method according to claim 3, further comprising analyzing the processing status to determine image data transfer in progress or transfer completion.

5. The control method according to claim 3, further comprising determining whether or not the acquired processing status indicates processing completion, wherein in a case where processing completion is determined, the data processing unit is controlled to complete processing operation.

6. A control method of an image processing apparatus, the image processing apparatus including (a) a data processing unit; (b) a first interface unit, having a plurality of logical channels, which is adapted to connect with an external processing apparatus; and (c) a second interface unit, having a logical channel that has a configuration different from the first interface unit, which is adapted to connect with the data processing unit, said method comprising:

controlling data transfer between the first interface unit and the second interface unit, wherein the first interface unit and the second interface unit are controlled so that image data is received through a logical channel, which is provided in the first interface unit, for the data processing unit, and the received image data is transferred to the data processing unit through the second interface unit, and wherein an image-data-reception standby state of the data processing unit is detected through the second interface unit, and the detected image-data-reception standby state is set as an image-data-reception standby state to be transmitted through the logical channel, which is provided in the first interface unit, for the data processing unit.

* * * * *